United States Patent
Hinze et al.

(10) Patent No.: US 11,470,200 B2
(45) Date of Patent: Oct. 11, 2022

(54) KEY SYSTEM MODULE FOR SOFTPHONE OR EMBEDDED VOICE APPLICATIONS

(71) Applicant: Charter Communications Operating, LLC, St. Louis, MO (US)

(72) Inventors: Holly Hinze, Highlands Ranch, CO (US); Edward A. Fitzgerald, IV, Aurora, CO (US); Steven Monti, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/036,089

(22) Filed: Sep. 29, 2020

(65) Prior Publication Data
US 2022/0103691 A1  Mar. 31, 2022

(51) Int. Cl.
| | |
|---|---|
| H04M 3/523 | (2006.01) |
| H04M 7/00 | (2006.01) |
| H04L 65/1069 | (2022.01) |
| H04M 1/253 | (2006.01) |
| H04L 61/4557 | (2022.01) |

(52) U.S. Cl.
CPC ........ *H04M 7/006* (2013.01); *H04L 61/4557* (2022.05); *H04L 65/1069* (2013.01); *H04M 1/2535* (2013.01); *H04M 3/523* (2013.01)

(58) Field of Classification Search
CPC .... H04M 1/2535; H04M 7/006; H04M 3/523; H04M 2203/45; H04L 65/1069
USPC .......................................................... 370/352
See application file for complete search history.

(56) References Cited

U.S. PATENT DOCUMENTS

| | | | |
|---|---|---|---|
| 6,192,118 B1 * | 2/2001 | Bayless | H04M 1/575 379/201.01 |
| 6,490,350 B2 * | 12/2002 | McDuff | H04M 3/51 379/265.06 |
| 6,650,748 B1 | 11/2003 | Edwards et al. | |
| 6,870,835 B1 | 3/2005 | Chen et al. | |
| 8,355,496 B2 | 1/2013 | Vendrow et al. | |
| 8,396,194 B2 * | 3/2013 | Pearson | H04M 3/42238 379/88.21 |

(Continued)

FOREIGN PATENT DOCUMENTS

JP  2010183430 A  *  8/2010

*Primary Examiner* — Ahmad F. Matar
*Assistant Examiner* — Jirapon Intavong
(74) *Attorney, Agent, or Firm* — Young Basile Hanlon & MacFarlane, P.C.

(57) ABSTRACT

Disclosed herein are methods and apparatus for a key system module which enables a presentable key system on devices provisioned with softphone and embedded voice applications. A method includes provisioning a key system module for operation with the softphone to enable the key system, establishing, by the softphone application using a service provider Internet Protocol (IP) telephony server, a non-shared line association with the key system, establishing, by the softphone application using the service provider IP telephony server, associations with key lines in the key system, receiving, from the service provider IP telephony server, key line statuses, generating, by the key system module, a key line user interface based on at least the statuses of the key lines, and presenting, by the softphone application and the key system module on a device associated with the softphone client, the key line user interface with the key lines in the key system.

20 Claims, 19 Drawing Sheets

(56) References Cited

U.S. PATENT DOCUMENTS

| | | | |
|---|---|---|---|
| 8,467,514 B1 | 6/2013 | Makhmudov et al. | |
| 8,514,780 B2 * | 8/2013 | Vangestad | H04M 3/42314 |
| | | | 370/328 |
| 8,577,011 B1 | 11/2013 | Madabhushi | |
| 8,670,545 B2 | 3/2014 | Vendrow | |
| 9,137,380 B2 | 9/2015 | Verbil et al. | |

* cited by examiner

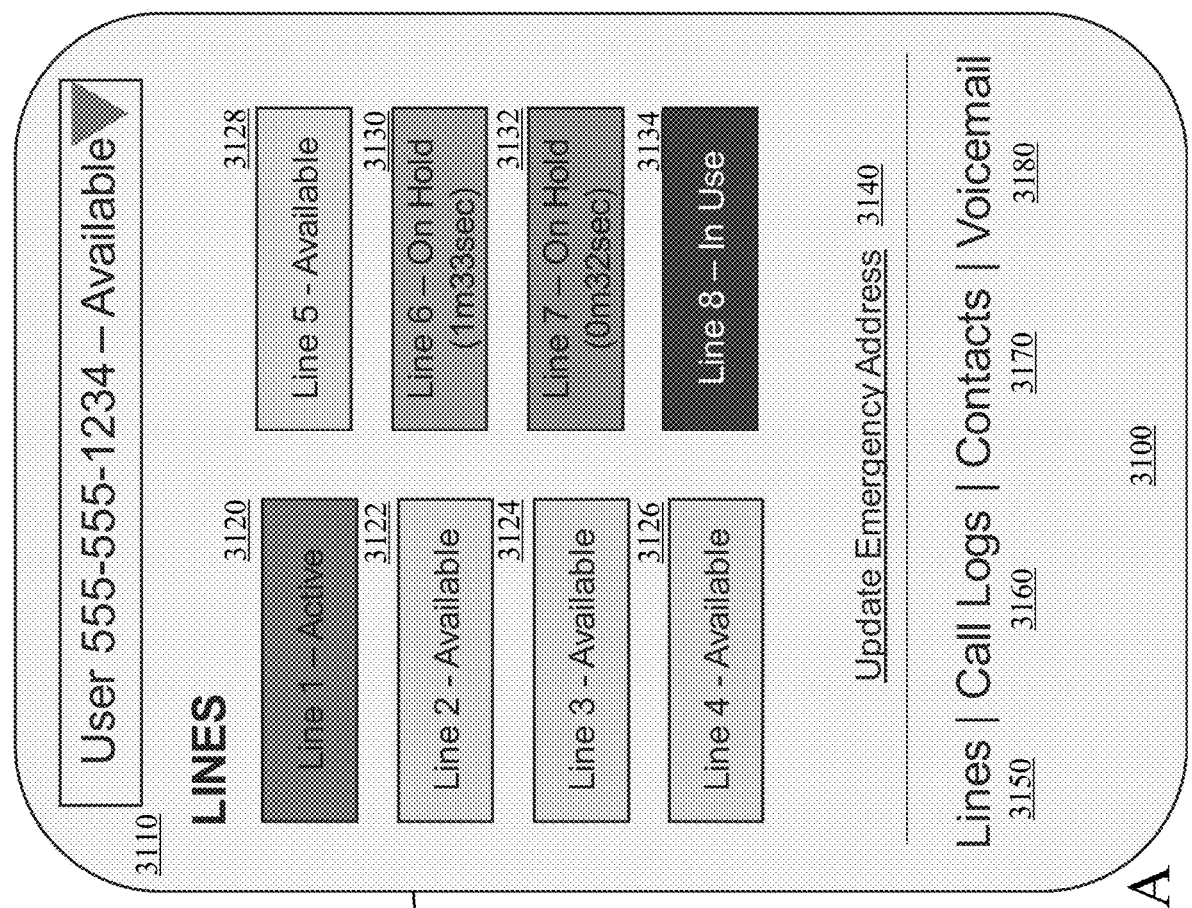
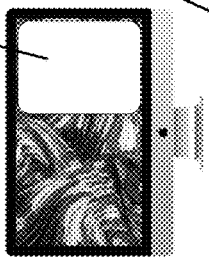
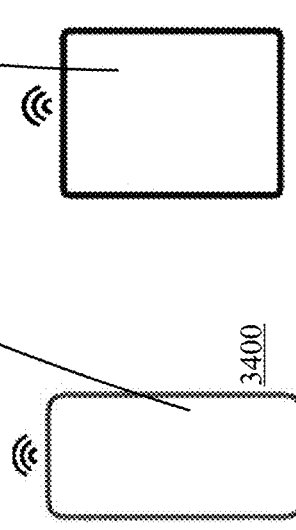
FIG. 3B  FIG. 3C  FIG. 3D  FIG. 3E  FIG. 3A

KEY SYSTEM MODULE FOR SOFTPHONE OR EMBEDDED VOICE APPLICATIONS

TECHNICAL FIELD

This disclosure relates to Internet Protocol (IP) telephony. More specifically, this disclosure relates to provisioning a key system user interface for softphone applications and embedded voice applications.

BACKGROUND

Companies are moving towards hosted voice solutions which enable a customer to have a fully functional telephone service without needing to purchase system hardware. These systems enable customers to make, receive and manage calls. The hosted services can be generally accessed via an application based softphone or touch screen enabled dedicated telephony hardware. A deficiency in existing hosted voice solutions is the lack of a key system solution. In a key system, handsets have multiple buttons representing individual lines. Users pick up the receiver and press a button to access a line, and the button lights up to show the line is in use. Customers prefer key system environments, as it enables multiple users to access, for example, a main number as it appears on a device associated with each of the multiple users.

SUMMARY

Disclosed herein are methods and apparatus for a key system module which enables a presentable and actional key system on softphone and embedded voice applications. In implementations, a method for implementing a key system for devices provisioned with a softphone application includes provisioning a key system module for operation with the softphone to enable the key system, establishing, by the softphone application using a service provider Internet Protocol (IP) telephony server, a non-shared line association with the key system, establishing, by the softphone application using the service provider IP telephony server, associations with key lines in the key system, receiving, from the service provider IP telephony server, statuses of the key lines, generating, by the key system module, a key line user interface based on at least the statuses of the key lines, and presenting, by the softphone application and the key system module on a device associated with the softphone client, the key line user interface with each of the key lines in the key system.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIGS. 3A-3E are diagrams of an example key system user interface and example devices and in accordance with embodiments of this disclosure.

DETAILED DESCRIPTION

Figure 1:
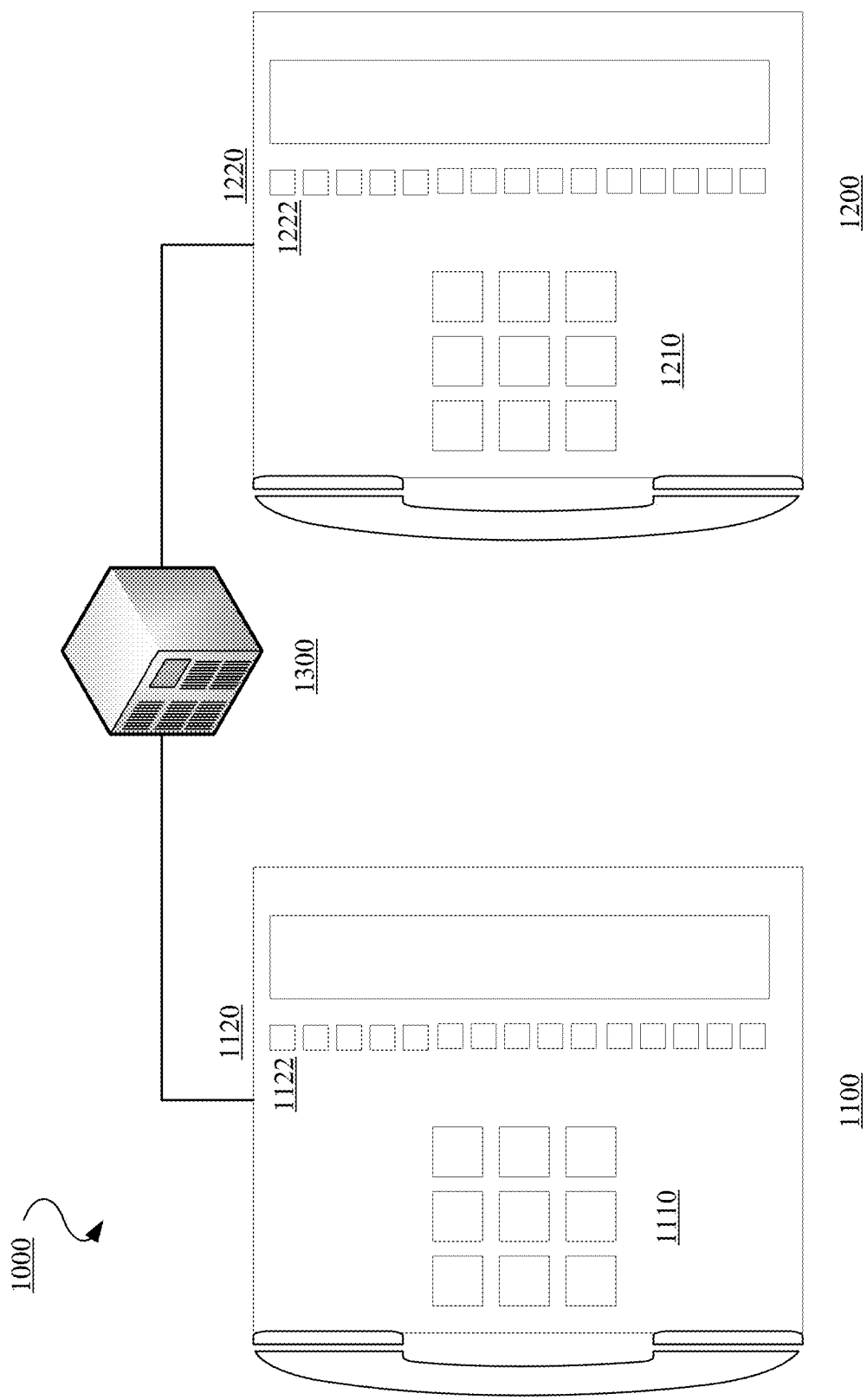
FIG. 1 is a diagram of an example key system.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, streaming, Internet Protocol (IP) video, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example traditional telephony system 1000 with a key system. The telephony system 1000 includes a first telephony handset or telephone 1100 and a second telephony handset or telephone 1200 connected to or in communication with (collectively "connected to") a Private Branch Exchange (PBX). The first telephony handset 1100 includes a physical number key section 1110 and a key line section 1120 with physical buttons 1122 for selecting a particular line. Similarly, the second telephony handset 1200 includes a physical number key section 1210 and a key line section 1220 with physical buttons 1222 for selecting a particular line. A call on the telephony system 1000 will ring on both the first telephony handset 1100 and the second telephony handset 1200. Once a line is selected on one of the first telephony handset 1100 and the second telephony handset 1200, a corresponding line on the other of the first telephony handset 1100 and the second telephony handset 1200 will indicate an active status. If a call is parked or hold on a line, all telephony handsets in the telephony system 1000 will have the same status. However, softphone and embedded voice applications do not have a user interface that has the ability to present or display and act on the above information.

Described herein are methods and apparatus for providing a key system module which enables a user interface with a presentable actionable key system on softphone and embedded voice applications (collectively referred to herein as "softphones" unless otherwise specified).

In implementations, the key system module provides a user interface for softphones which presents actional soft keys for a personal line as well as key, shared, or monitored lines (collectively "key lines" unless otherwise specified) as described herein. In implementations, the key system module enables a user to perform an action with respect to a key line on the softphone. The key system module captures Session Initiation Protocol (SIP) signal messages or other like signaling protocol signal messages which are used for initiating, maintaining, and terminating real-time sessions that include voice, video and messaging applications, for example. The key system module uses the captured information to update and populate presentable actional soft keys on other user interfaces on other softphones with the status of the acted upon key line. Consequently, multiple users can see key line status for multiple key lines on softphones and act on the multiple key lines as appropriate and applicable.

In implementations, the key system module enables a shared appearance user interface for provisioned shared lines. Each shared line can be used for accepting inbound calls, placing outbound calls, placing calls on hold, and other appropriate and applicable actions. In implementations, each shared line can be used for a single telephone number or identity. In implementations, each shared line can be used for multiple telephone numbers or identities. Shared line status is updated at other shared line appearance user interfaces having the provisioned shared lines. In implementations, the shared appearance user interface can include other telephony and communication related features such as, but not limited to, voicemail, instant messaging, contacts, call history, chat, texting, and the like.

In implementations, the key system module enables a parked call monitoring user interface for provisioned park lines. Each park line can be used for retrieving calls and parking a call. Park line status is updated at other parked call monitoring user interfaces having the provisioned park lines. In implementations, the parked call monitoring user interface can include other telephony and communication related features such as, but not limited to, voicemail, instant messaging, contacts, call history, chat, texting, and the like.

In implementations, the key system module can be a standalone module which interfaces with a softphone or embedded voice application, with an interface for touch screen provisioned IP telephony handsets, or other appropriate and applicable communication applications.

In implementations, the key system module can be integrated with a softphone or embedded voice application, with an interface for the touch screen provisioned IP telephony handsets, or other appropriate and applicable communication applications.

Figure 2:
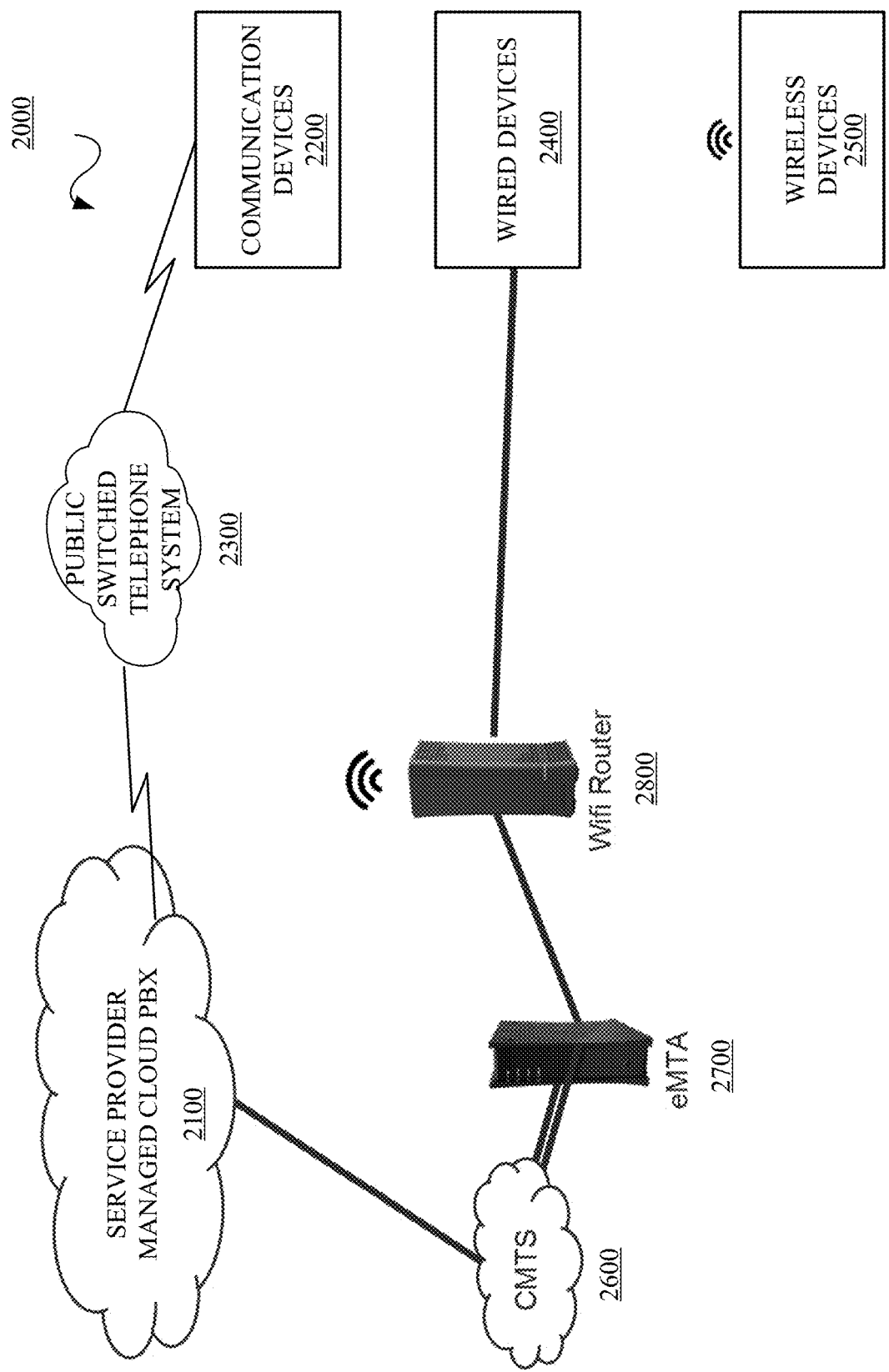
FIG. 2 is a diagram of an example architecture using a key system module which enables a presentable actionable key system on IP telephony devices in accordance with embodiments of this disclosure.

FIG. 2 is a diagram of an example network, architecture, or system 2000 using a key system module which enables a presentable actionable key system on softphones in accordance with embodiments of this disclosure. In implementations, the system 2000 includes a service provider managed cloud PBX 2100 connected to or in communication (collectively "connected to") with communication devices 2200 via, for example a public switched telephone system 2300, wireless systems, and/or other communication interfaces and/or platforms. The service provider managed cloud PBX 2100 is also connected to wired devices 2400 and wireless devices 2500 via a cable modem termination system (CMTS) 2600, an Embedded Multimedia Terminal Adapter (eMTA) 2700 and a WiFi router 2800. The connections between the service provider managed cloud PBX 2100, the communication devices 2200, the public switched telephone system 2300, the wired devices 2400, the wireless devices 2500, the CMTS 2600, the eMTA 2700, and the WiFi router 2800 can be wired, wireless or combinations thereof. In an implementation, the system 2000 may execute the techniques described in FIG. 16. The network, system, and the components therein may include other elements which may be desirable or necessary to implement the devices, systems, compositions, and methods described herein. However, because such elements and steps are well known in the art, and because they do not facilitate a better understanding of the disclosed embodiments, a discussion of such elements and steps may not be provided herein.

The service provider managed cloud PBX 2100 can provide IP telephony connectivity between the communication devices 2200, the wired devices 2400, and the wireless devices 2500 using at least the elements and components described herein. The service provider managed cloud PBX 2100 or hosted PBX can provide communication access to users via the Internet and associated IP communication protocols and signaling using call flows, for example.

The communication devices 2200 can be wired, wireless, and/or other telephony devices for communicating with other communication devices including for example, wired devices 2400 and wireless devices 2500.

The public switched telephone system 2300 is a telephony infrastructure which includes, but is not limited to, telephone lines, fiber optic cables, microwave transmission links, cellular networks, communications satellites, and undersea telephone cables, which are interconnected to provide services for public telecommunication.

The wired devices 2400 and wireless devices 2500 are devices provisioned with softphones, where the devices can be, but is not limited to, mobile phones, tablets, laptops with touch enabled or click enabled user interface, desktops with touch enabled or click enabled user interface, and the like. The wired devices 2400 and wireless devices 2500 are provisioned with a key system module as described herein.

With respect to the illustrative wired devices 2400 and wireless devices 2500, FIGS. 3A-3E are diagrams of example devices and an example key system user interface in accordance with embodiments of this disclosure. FIG. 3A is an example of a key line user interface 3000 in accordance with embodiments of this disclosure. The key line user interface 3000 can include multiple key line user interface screens or pages as described herein. Key line user interface screen 3100 is example key line user interface screen which shows a user or personal line 3110 in an available state, 8 key lines 3120, 3122, 3124, 3126, 3128, 3130, 3132, and 3134, a link to an emergency address 3140, and multiple links to other screens or pages including Lines 3150, Call Logs 3160, Contacts 3170, Voicemail 3180, and other features. As shown key line 1 3120 is active, key lines 2-5 3122, 3124, 3126, and 3128, respectively, are available, key line 6 3130 is on hold for a defined time, key line 7 3132 is on hold for a defined time, and key line 8 3134 is in use. In implementations, different statuses can be in different colors. FIG. 3B is an example of a touch screen provisioned IP telephony handset 3200 which is provisioned with a key line user interface such as a key line user interface 3000 and a softphone application. FIG. 3C is an example of a desktop 3300 which is provisioned with a key line user interface such as a key line user interface 3000 and a softphone application. FIG. 3D is an example of a mobile phone 3400 which is provisioned with a key line user interface such as a key line user interface 3000 and a softphone application. FIG. 3E is an example of a tablet 3500 which is provisioned with a key line user interface such as a key line user interface 3000 and a softphone application. In implementations, an embedded voice application can be used and/or other similar applications instead of softphone applications without departing from the scope of the specification or claims herein.

Figure 4B:
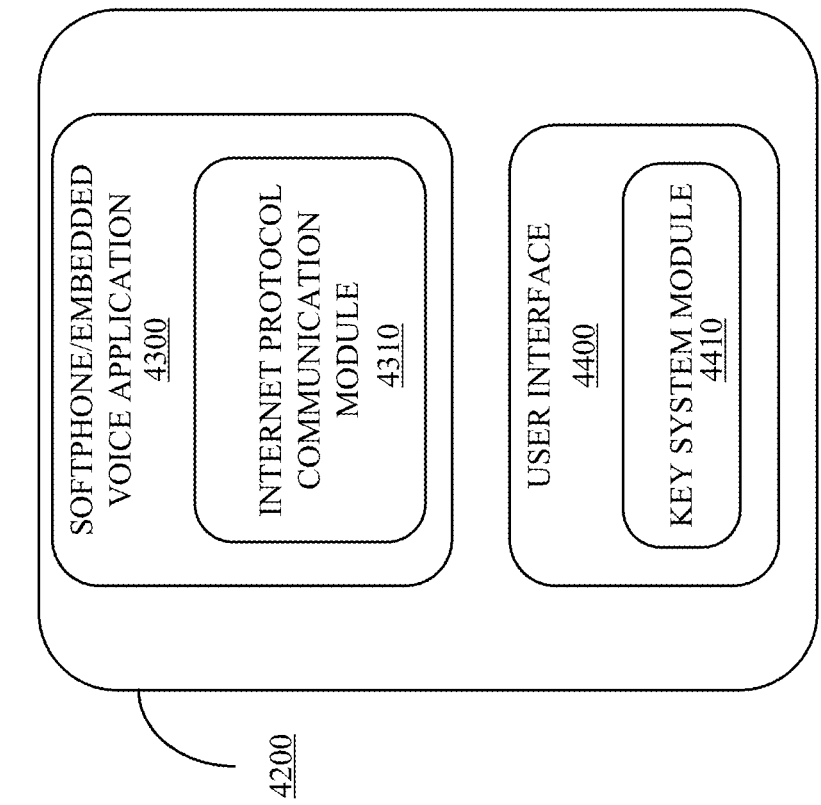
FIGS. 4A-4B are diagrams of example key system module implementations in accordance with embodiments of this disclosure.
Figure 4A:
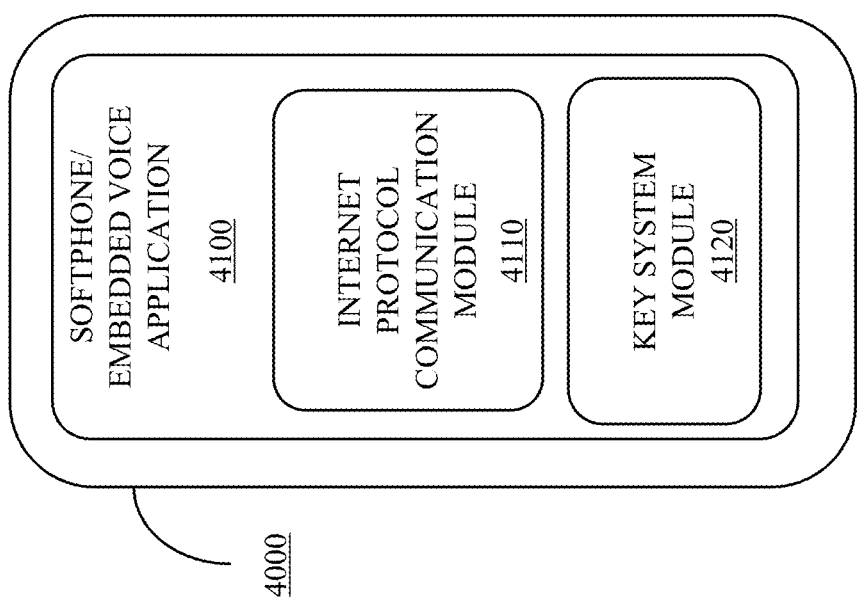

With respect to the illustrative wired devices 2400 and wireless devices 2500, FIGS. 4A and 4B are diagrams of example key system module implementations in accordance with embodiments of this disclosure. FIG. 4A is an IP telephone device 4000 which is provisioned with a softphone application and/or embedded voice application 4100 which uses at least an Internet Protocol (IP) communication module 4110 to implement IP telephony communications and a key system module 4120 which enables a key line user interface. The key system module 4120 operates as described herein. FIG. 4B is an IP telephony device 4200 which is provisioned with a softphone application and/or embedded voice application 4300 which uses at least an Internet Protocol (IP) communication module 4310 to implement IP telephony communications. The IP telephony device 4200 also includes a user interface 4400 which includes a key system module 4410 which enables a key line user interface. The key system module 4410 operates as described herein.

Figure 5:
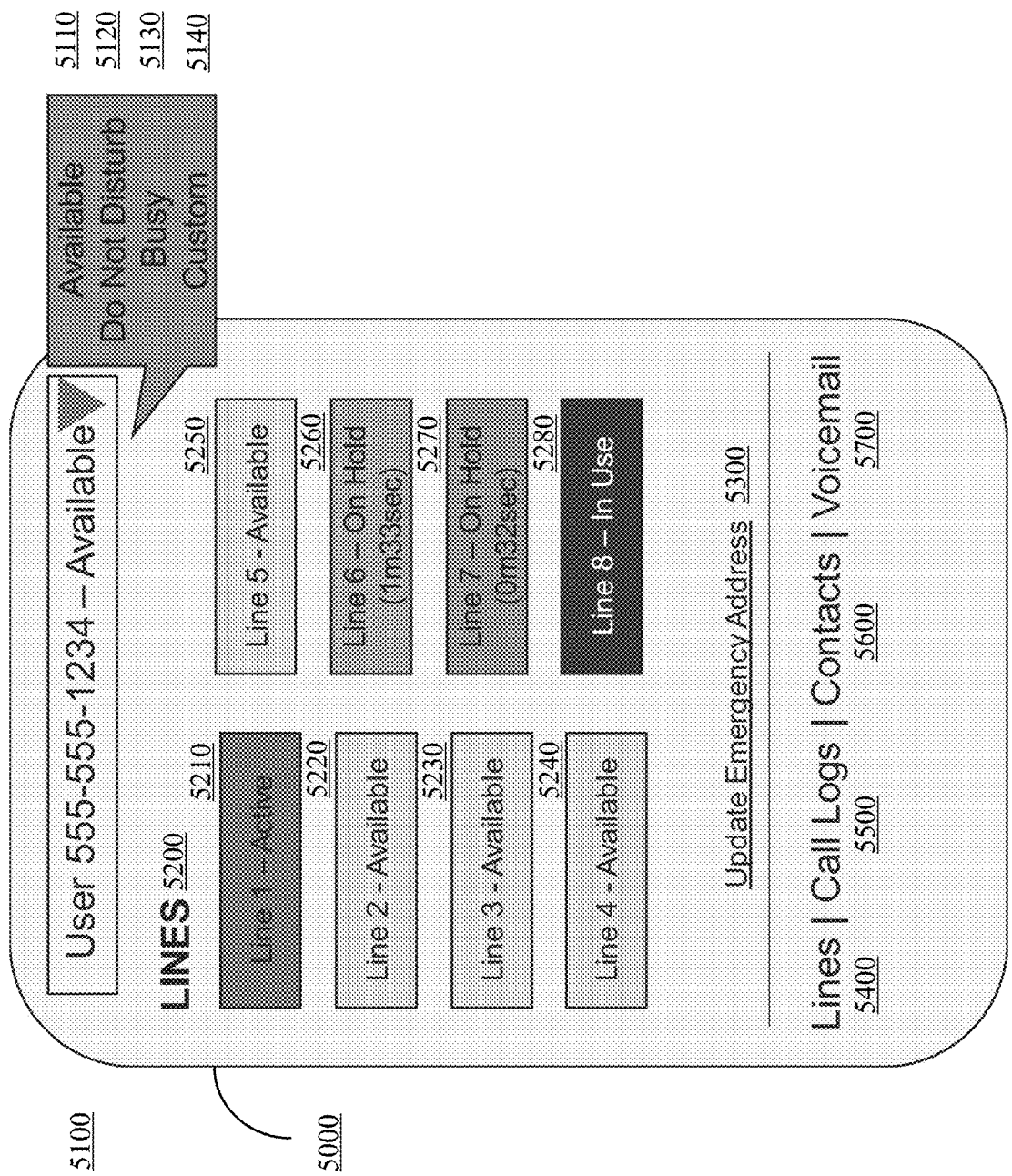
FIG. 5 is a diagram of an example key system user interface in accordance with embodiments of this disclosure.

With respect to the illustrative wired devices 2400 and wireless devices 2500, FIG. 5 is a diagram of an example key system user interface 5000 in accordance with embodiments of this disclosure. The key system user interface 5000 includes a user or personal line 5100 which can be in an available state 5110, a Do Not Disturb state 5120, a Busy state 5130, and a Custom state 5140. The key system user interface 5000 includes 8 key lines including key line 1 5210, key line 2 5220, key line 3 5230, key line 4 5240, key line 5 5250, key line 6 5260, key line 7 5270, and key line 8 5280. As shown, the key line 1 5210 is in an active state, the key line 2 5220 is in an available state, the key line 3 5230 is in an available state, the key line 4 5240 is in an available state, the key line 5 5250 is in an available state, the key line 6 5260 is in a hold state for a defined time period, the key line 7 5270 is in a hold state for a defined time period, and the key line 8 5280 is in a In Use state. The key system user interface 5000 includes an emergency address soft key 5300 which can go to another page or screen. The key system user interface 5000 includes multiple soft keys to other screens or pages including Lines 5400, Call Logs 5500, Contacts 5600, Voicemail 5700, and other features. In implementations, each key line can service one or more telephone numbers or identities. Furthermore, the sum or collection of key lines can also service one or more telephone numbers or identities.

Figure 7:
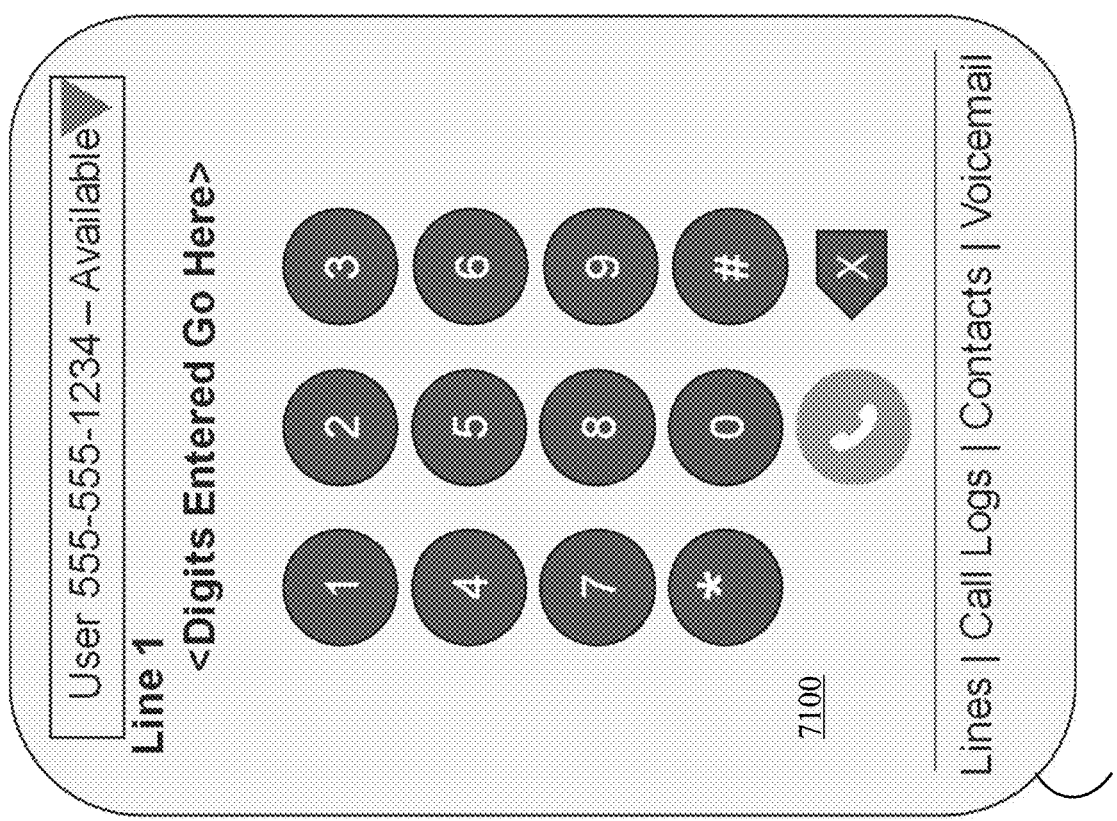
FIG. 7 is a diagram of an example key system user interface in accordance with embodiments of this disclosure.
Figure 6:
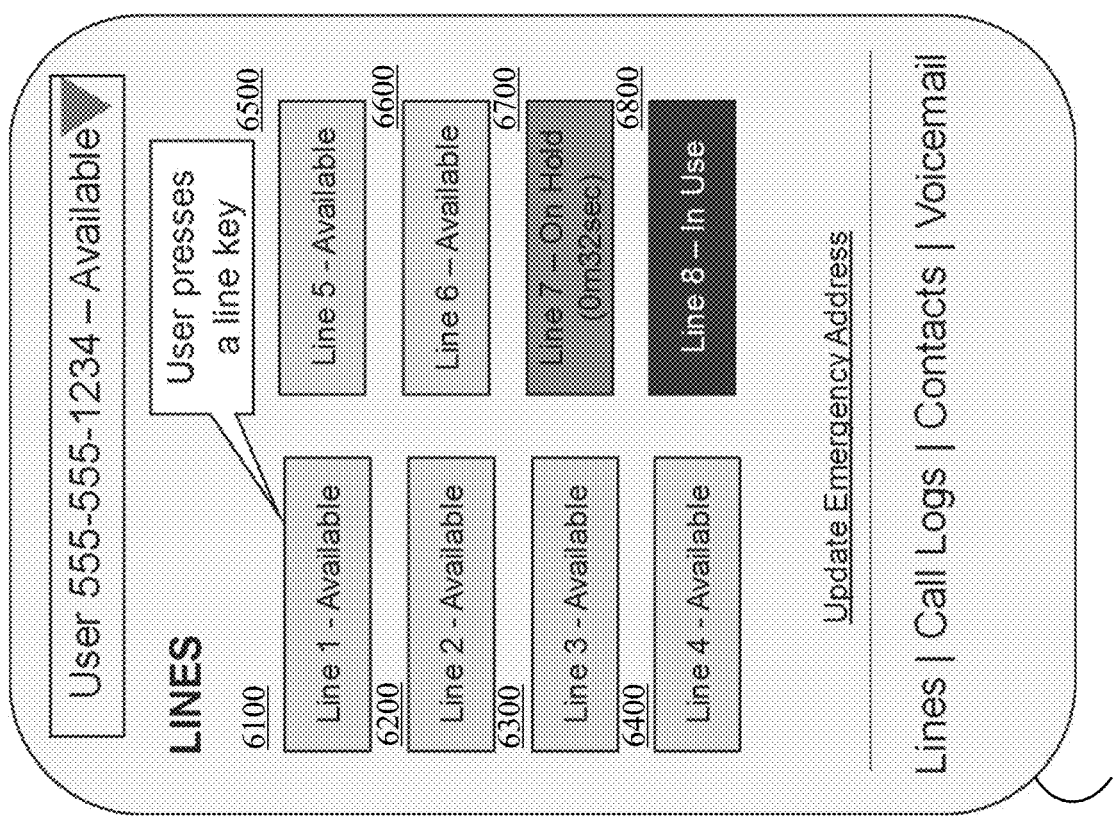
FIG. 6 is a diagram of an example key system user interface in accordance with embodiments of this disclosure.

With respect to the illustrative wired devices 2400 and wireless devices 2500, FIG. 6 is a diagram of an example key system user interface 6000 with a user picking a line in accordance with embodiments of this disclosure and FIG. 7 is a diagram of an example key system user interface 7000 with a number entry keypad in accordance with embodiments of this disclosure. The key system user interface 6000 is similar to the key system user interface 5000 except for the status of key lines. In FIG. 6, key line 1 6100 is in an available state, key line 2 6200 is in an available state, key line 3 6300 is in an available state, key line 4 6400 is in an available state, key line 5 6500 is in an available state, key line 6 6600 is in an available state, key line 7 6700 is in a hold state for a defined time period, and the key line 8 6800 is in a In Use state. In this instance, a user selects the key line 1 6100 to make an outbound call. In FIG. 7, the key system user interface 7000 includes a number keypad 7100 in response to the user selecting key line 1 6100.

Figure 8:
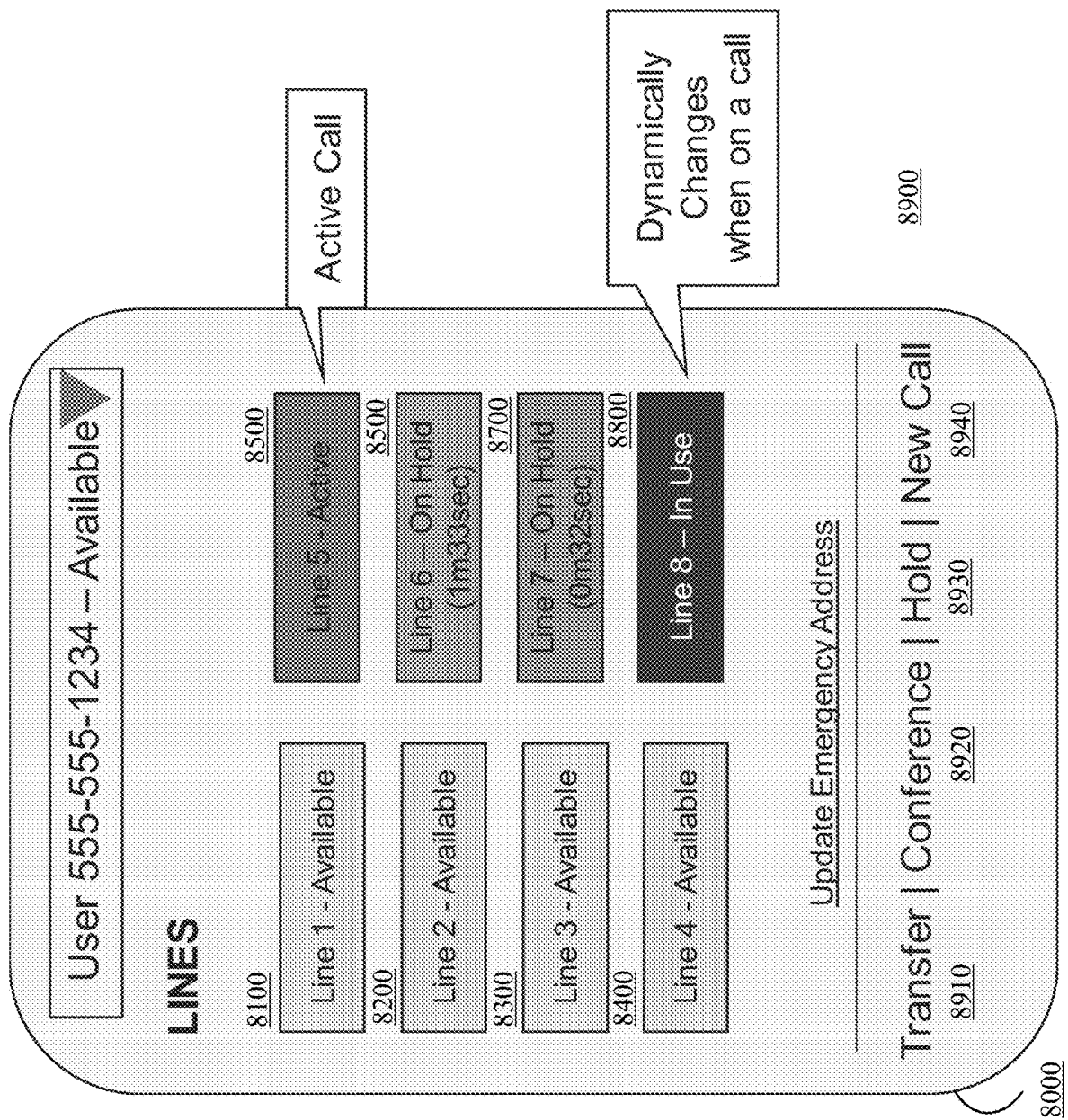
FIG. 8 is a diagram of an example key system user interface in accordance with embodiments of this disclosure.

With respect to the illustrative wired devices 2400 and wireless devices 2500, FIG. 8 is a diagram of an example key system user interface 8000 in accordance with embodiments of this disclosure. The key system user interface 8000 is similar to the key system user interface 5000 and 6000 except for the status of key lines and other displayed features. In FIG. 8, key line 1 8100 is in an available state, key line 2 8200 is in an available state, key line 3 8300 is in an available state, key line 4 8400 is in an available state, key line 5 8500 is in an active state, key line 6 8600 is in a hold state for a defined time period, key line 7 8700 is in a hold state for a defined time period, and the key line 8 8800 is in a In Use state. The key system user interface 8000 changes in response to an active call and includes other features 8900 such as a Transfer 8910 soft key, a Conference 8920 soft key, a Hold 8930 soft key, and a New Call 8940 soft key.

Figure 9:
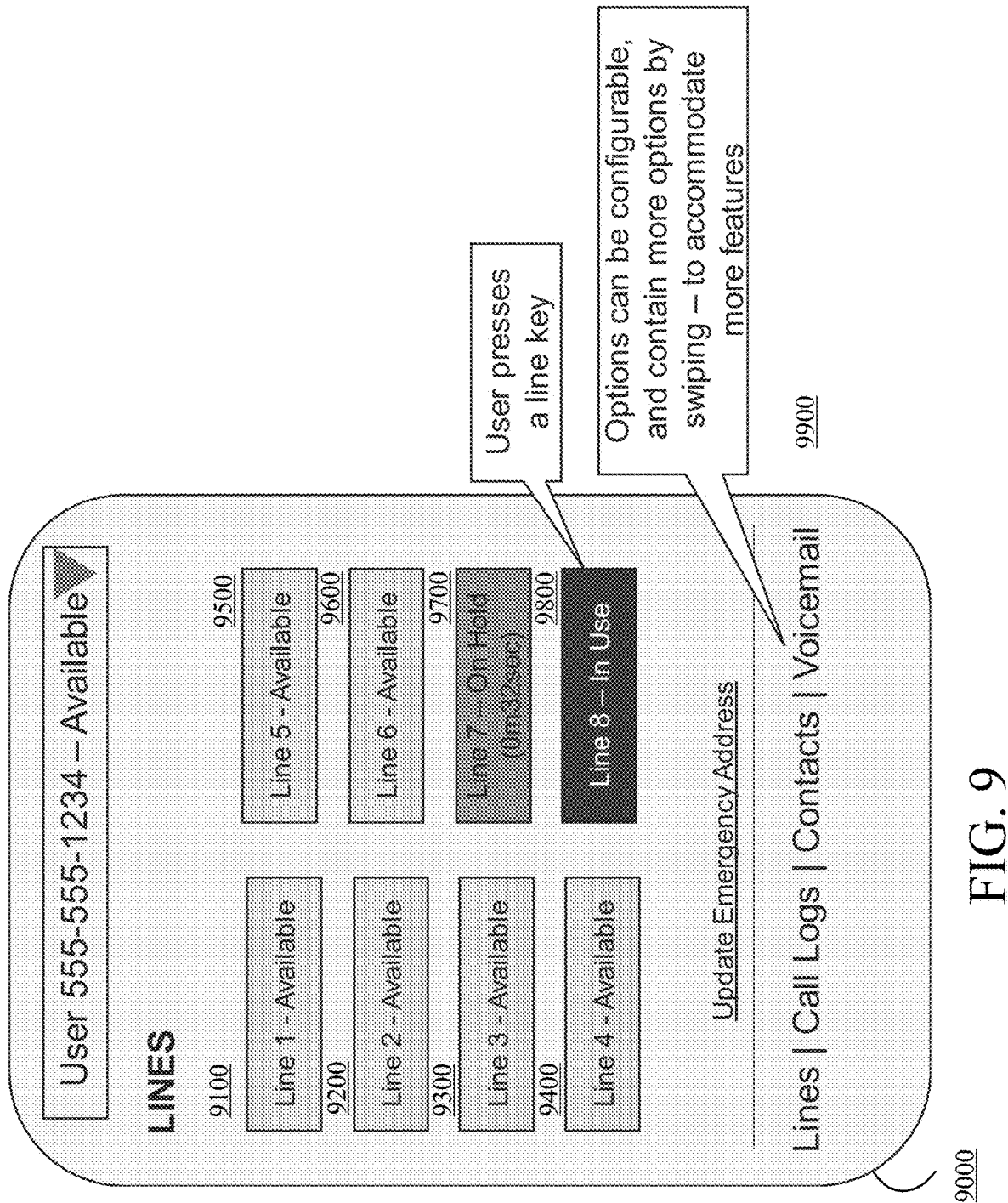
FIG. 9 is a diagram of an example key system user interface in accordance with embodiments of this disclosure.

With respect to the illustrative wired devices 2400 and wireless devices 2500, FIG. 9 is a diagram of an example key system user interface 9000 in accordance with embodiments of this disclosure. The key system user interface 9000 is similar to the key system user interface 5000, 6000, and 8000 except for the status of key lines and other displayed features. In FIG. 9, key line 1 9100 is in an available state, key line 2 9200 is in an available state, key line 3 9300 is in an available state, key line 4 9400 is in an available state, key line 5 9500 is in an available state, key line 6 9600 is in an available state, key line 7 9700 is in a hold state for a defined time period, and the key line 8 9800 is in a In Use state. In at least the implementations described herein, any user in the key system with a provisioned IP telephony device can press or select a soft key associated with a key line that has a hold status to retrieve the call that is on hold. In at least the implementations described herein, if a user in the key system with a provisioned IP telephony device presses or selects a key line that is in use, the user will barge into the call and participants on the call will hear a barge tone. In at least the implementations described herein, users can swipe along a bottom features menu 9900 to see more features. In at least the implementations described herein, the bottom features menu 9900 is customizable. These additional features can include, but are not limited to, instant messaging with other users in the key line system, text messaging (SMS/MMS) to users outside of the business, presence (ability to see the status of other users), on demand conference calling (with or without a webinar), desktop sharing via webinar, file sharing with other users, and/or video calling. In implementations, the number of key lines is variable. In implementations, the number of users of the key line system is variable. In implementations, each key line can service one or more telephone numbers or identities. Furthermore, the sum or collection of key lines can also service one or more telephone numbers or identities.

Figure 10:
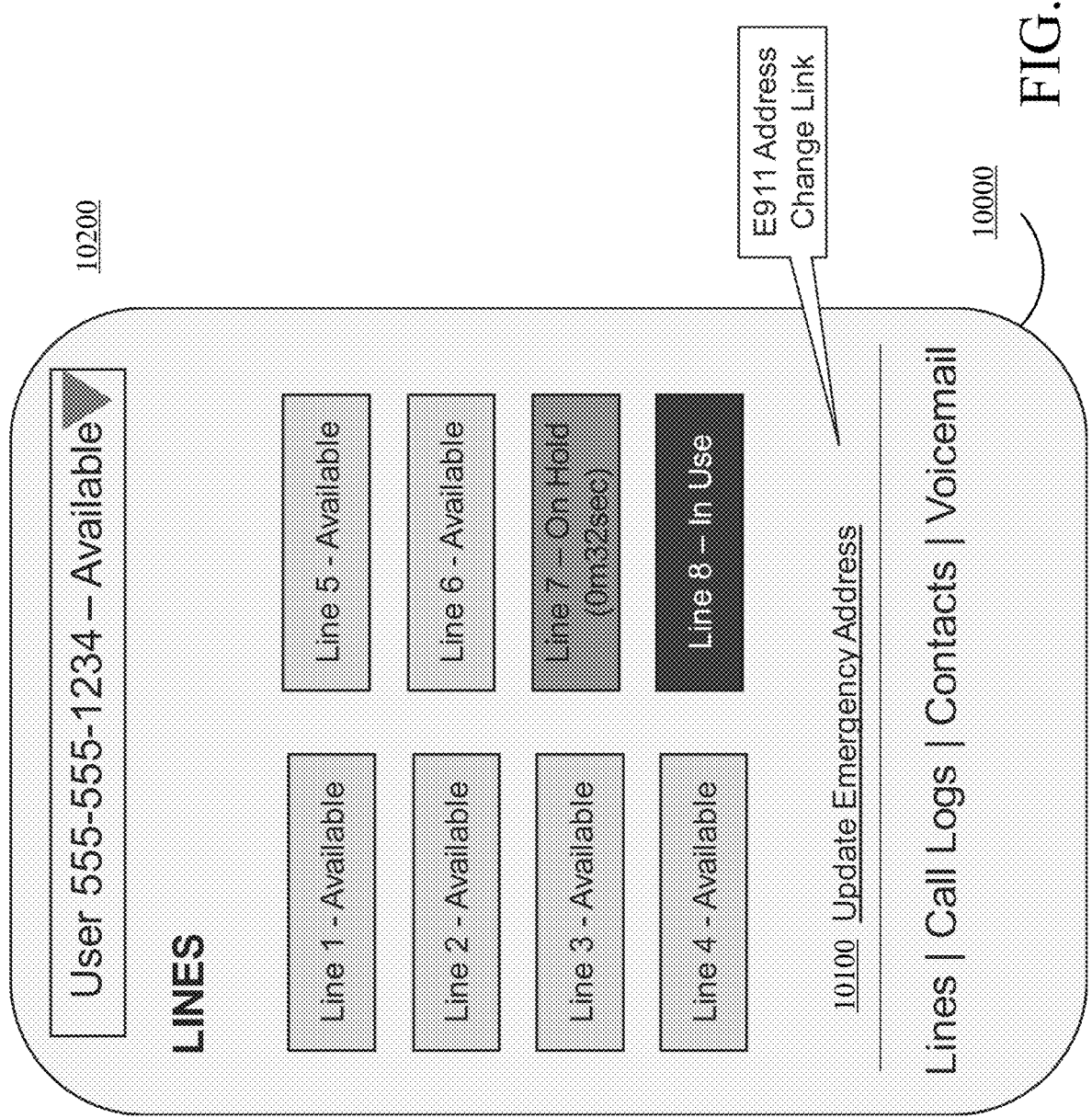
FIG. 10 is a diagram of an example key system user interface in accordance with embodiments of this disclosure.

With respect to the illustrative wired devices 2400 and wireless devices 2500, FIG. 10 is a diagram of an example key system user interface 10000 in accordance with embodiments of this disclosure. The key system user interface 10000 is similar to the key system user interface 5000, 6000, 8000 and 9000. In implementations, an Update Emergency Address soft key 10100 links to a page for updating a user E911 address. Each user can be set up with a personal or private line 10200 that can be used for separate 911 addresses, and force all 911 calls through that line.

The cable modem termination system 2600 can provide high speed data services, cable Internet, Voice over Internet Protocol, and like services to service provider subscribers located at, for example, at a premises. In implementations, the connection between the cable modem termination system 2600 and the eMTA 2700 is wired.

The eMTA 2700 is a combination cable modem and telephone adapter which connects traditional analog telephones, fax machines, and similar customer-premises devices to a digital telephone system or an IP telephony network.

The WiFi router 2800 receives information from and transmits information to the wired devices 2400 and the wireless devices 2500. The WiFi router 2800 allows the wired devices 2400 and the wireless devices 2500 use the Internet connection at once and allows the wired devices 2400 and the wireless devices 2500 them to communicate with one another without having to do so over the Internet.

Figure 11:
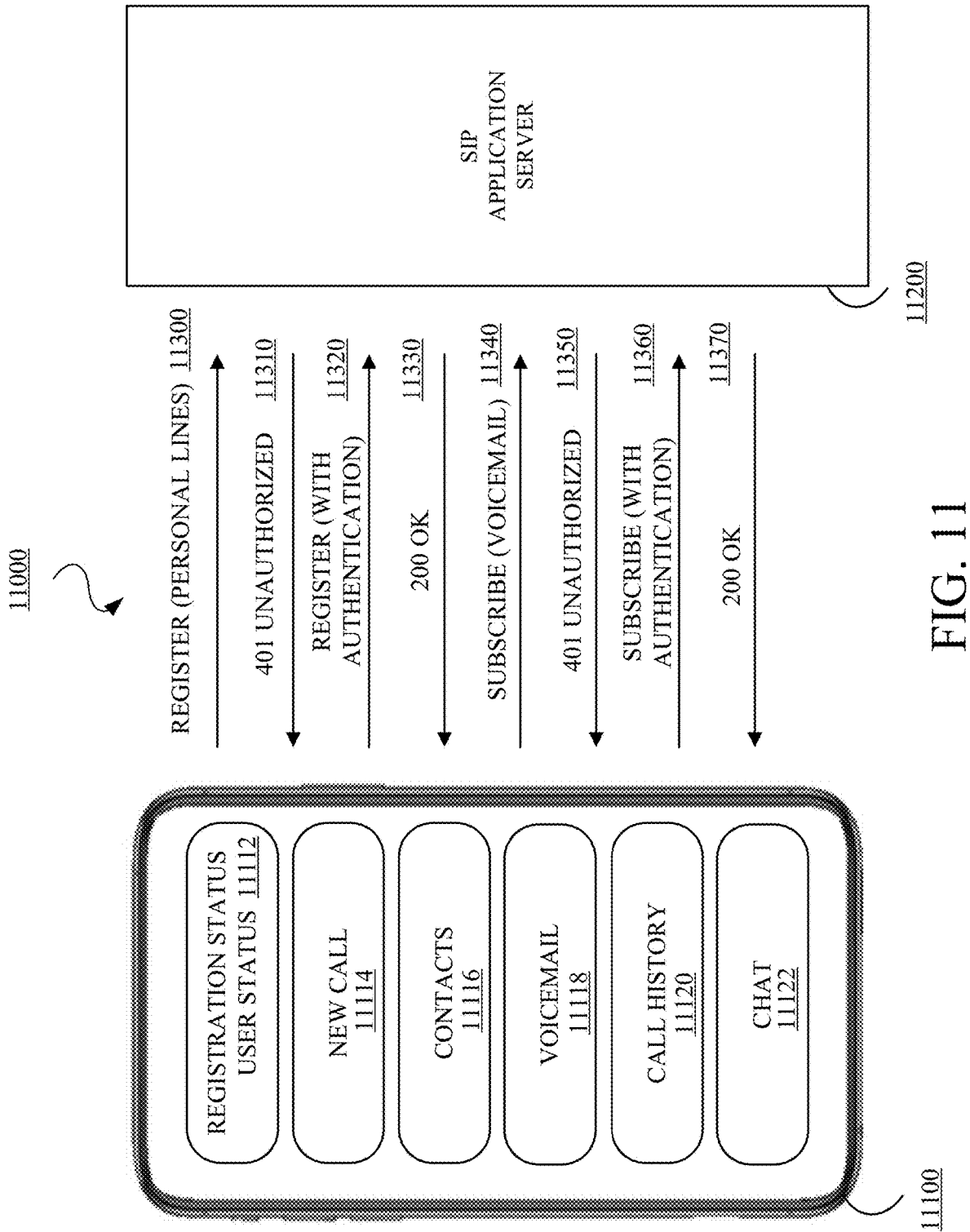
FIG. 11 is a diagram of an example personal line registration and subscription in accordance with embodiments of this disclosure.

FIG. 11 is a diagram of an example personal line registration and subscription flow 11000 in accordance with embodiments of this disclosure. The flow 11000 is described with respect to a provisioned IP telephony device 11100 and a SIP application server 11200 (which can be in the service provider managed cloud PBX 2100 of FIG. 2, for example) and is not inclusive of all messages and highlights key messages without departing from the scope of the specification or the claims. A key line user interface 11110 of the provisioned IP telephony device 11100 can include status windows or soft keys for a registration status/user status 11112, a new call 11114, contacts 11116, voicemail 11118, a call history 11120, and chat 11122.

Activation of the provisioned IP telephony device 11100 or a softphone application provisioned in the IP telephony device 11100 can initiate sending of a Register message for a personal line associated with the provisioned IP telephony device 11100 (11300). The SIP application server 11200 sends a 401 Unauthorized message in response to the Registration message (11310). The provisioned IP telephony device 11100 or softphone application sends a Register with Authentication message to the SIP application server 11200 in response to the Unauthorized message (11320). The SIP application server 11200 sends a 200 OK message in response to the Register with Authentication message (11330). The provisioned IP telephony device 11100 or softphone application sends a Subscribe message for each feature designated by the user, for example, voicemail, to the SIP application server 11200 (11340). The SIP application server 11200 sends a 401 Unauthorized message in response to the Subscribe message (11350). The provisioned IP telephony device 11100 or softphone application sends a Subscribe with Authentication message for each feature designated by the user, for example, voicemail, to the SIP application server 11200 (11360). The SIP application server 11200 sends a 200 OK message in response to the Subscribe with Authentication message (11370). In implementations, the flow 11000 is done once and then maintained per the SIP messaging protocol. In implementations, the flow 11000 is done prior to registration and subscription of key line registration and subscription. Each user that wants to communicate with others in the system would need to register and subscribe per flow 11000.

Figure 12A:
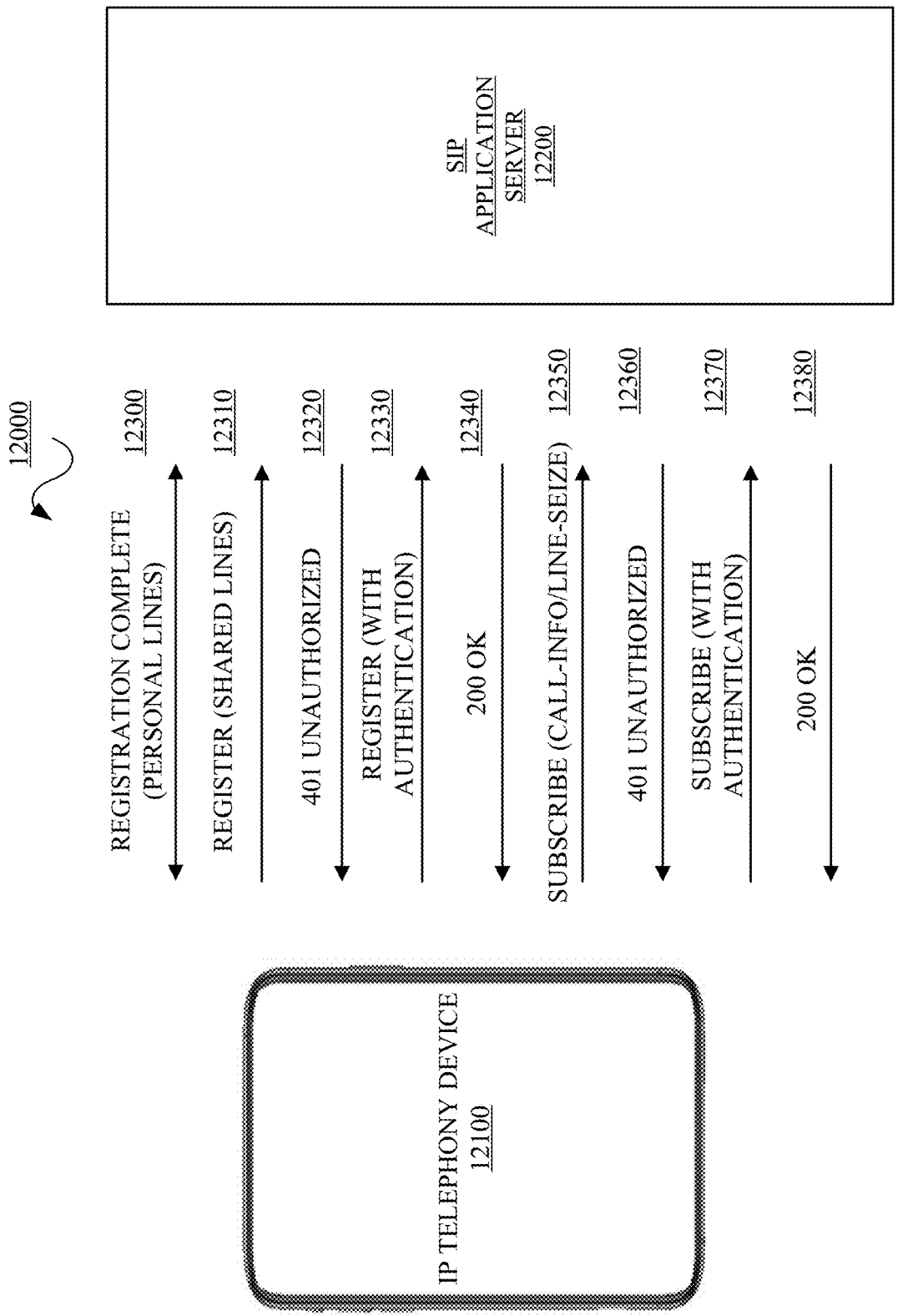
FIG. 12A is a diagram of an example shared line registration and subscription in accordance with embodiments of this disclosure.

FIG. 12A is a diagram of an example shared line or call appearance registration and subscription flow 12000 in accordance with embodiments of this disclosure. The flow 12000 is described with respect to a provisioned IP telephony device 12100 and a SIP application server 12200 (which can be in the service provider managed cloud PBX 2100 of FIG. 2, for example) and is not inclusive of all messages and highlights key messages without departing from the scope of the specification or the claims. The key module system captures the messages in the flows described herein (including those not shown for purposes of illustration but are understood to one of skill in the technology) and generates the key line accessible, presentable, and/or actionable user interfaces described herein.

The provisioned IP telephony device 12100 registers and subscribes per the flow 11000 of FIG. 11 (12300). The IP telephony device 12100 sends a Register message for Shared Lines to the SIP application server 12200 (12310). The SIP application server 12200 sends a 401 Unauthorized message in response to the Registration message (12320). The provisioned IP telephony device 12100 or softphone application sends a Register with Authentication message to the SIP application server 12200 in response to the Unauthorized message (12330). The SIP application server 12200 sends a 200 OK message in response to the Register with Authentication message (12340). The provisioned IP telephony device 12100 or softphone application sends a Subscribe message for call-information and/or line seize to the SIP application server 12200 (12350). The SIP application server 12200 sends a 401 Unauthorized message in response to the Subscribe message (12360). The provisioned IP telephony device 12100 or softphone application sends a Subscribe with Authentication message for the call-information and/or line seize to the SIP application server 12200 (12370). The SIP application server 12200 sends a 200 OK message in response to the Subscribe with Authentication message (12380). Each shared line in the key system needs to register and subscribe. The call-information and/or line seize subscription is done for each registered and subscribed shared line. In implementations, voicemail can be subscribed for each shared line or for a common voicemail used by all of the shared lines.

Figure 12B:
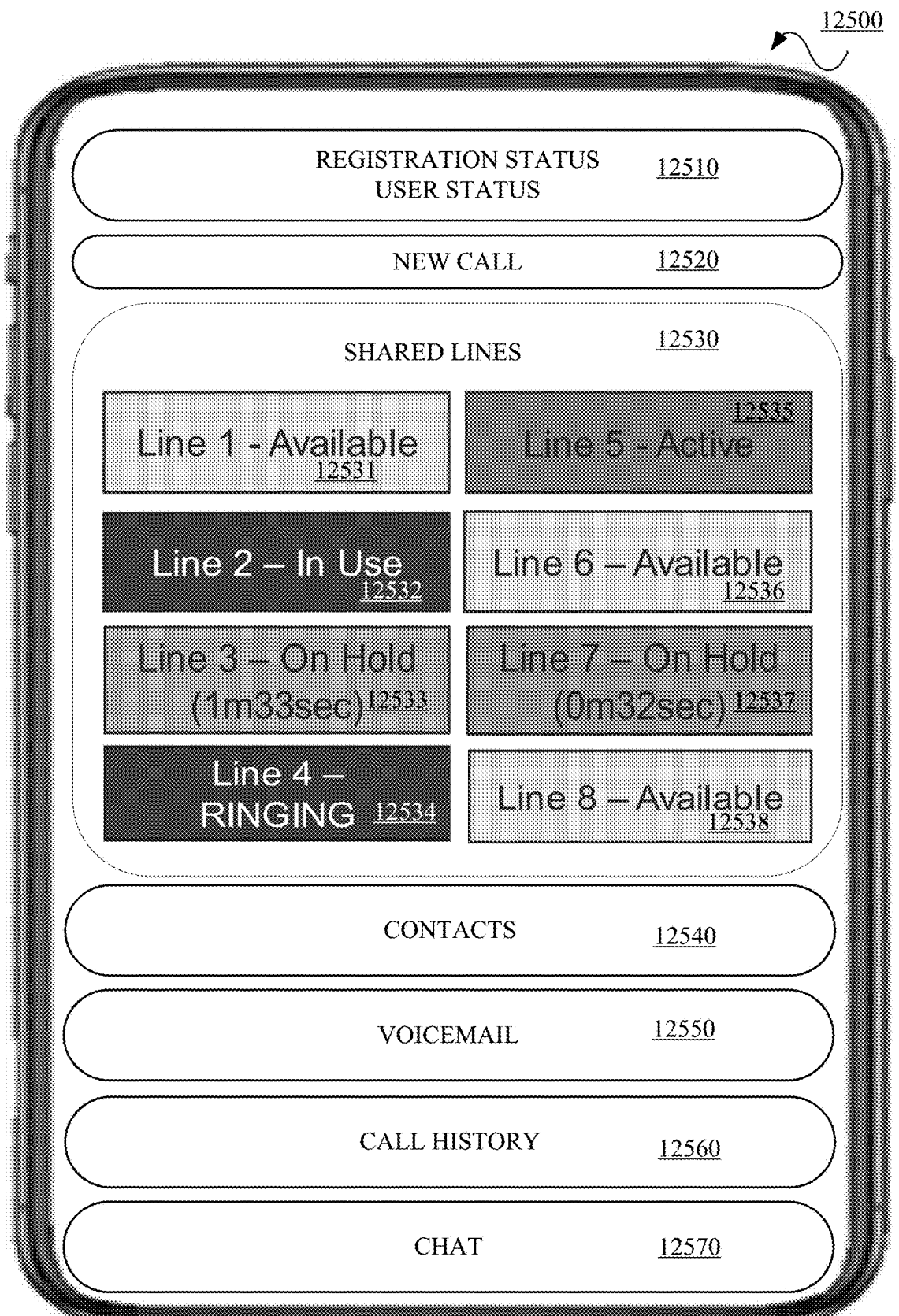
FIG. 12B is a diagram of an example shared line appearance—key system user interface in accordance with embodiments of this disclosure.

FIG. 12B is a diagram of an example shared line appearance—key system user interface 12500 in accordance with embodiments of this disclosure. The shared line appearance—key system user interface 12500 can include a registration status/user status section 12510, where a section can be a soft key, button, indicator area, and the like, a new call section 12520, a shared lines section 12530, a contacts section 12540, a voicemail section 12550, a call history section 12560, a chat section 12570, and other sections or features as described herein. In implementations, the registration status/user status section 12510 can indicate the status of the personal line. The shared lines section 12530 can include multiple shared lines including shared line 1 12531, shared line 2 12532, shared line 3 12533, shared line 4 12534, shared line 5 12535, shared line 6 12536, shared line 7 12537, and shared line 8 12538. The status of the shared lines can include Available, Active, In Use, On Hold, Ringing, and the like. For example, the shared line 1 12531 has a status of Available, the shared line 2 12532 has a status of In Use, the shared line 3 12533 has a status of On Hold with a time, the shared line 4 12534 has a status of Ringing, the shared line 5 12535 has a status of Active, the shared line 6 12536 has a status of Available, the shared line 7 12537 has a status of On Hold with a time, and the shared line 8 12538 has a status of Available.

Figure 12C:
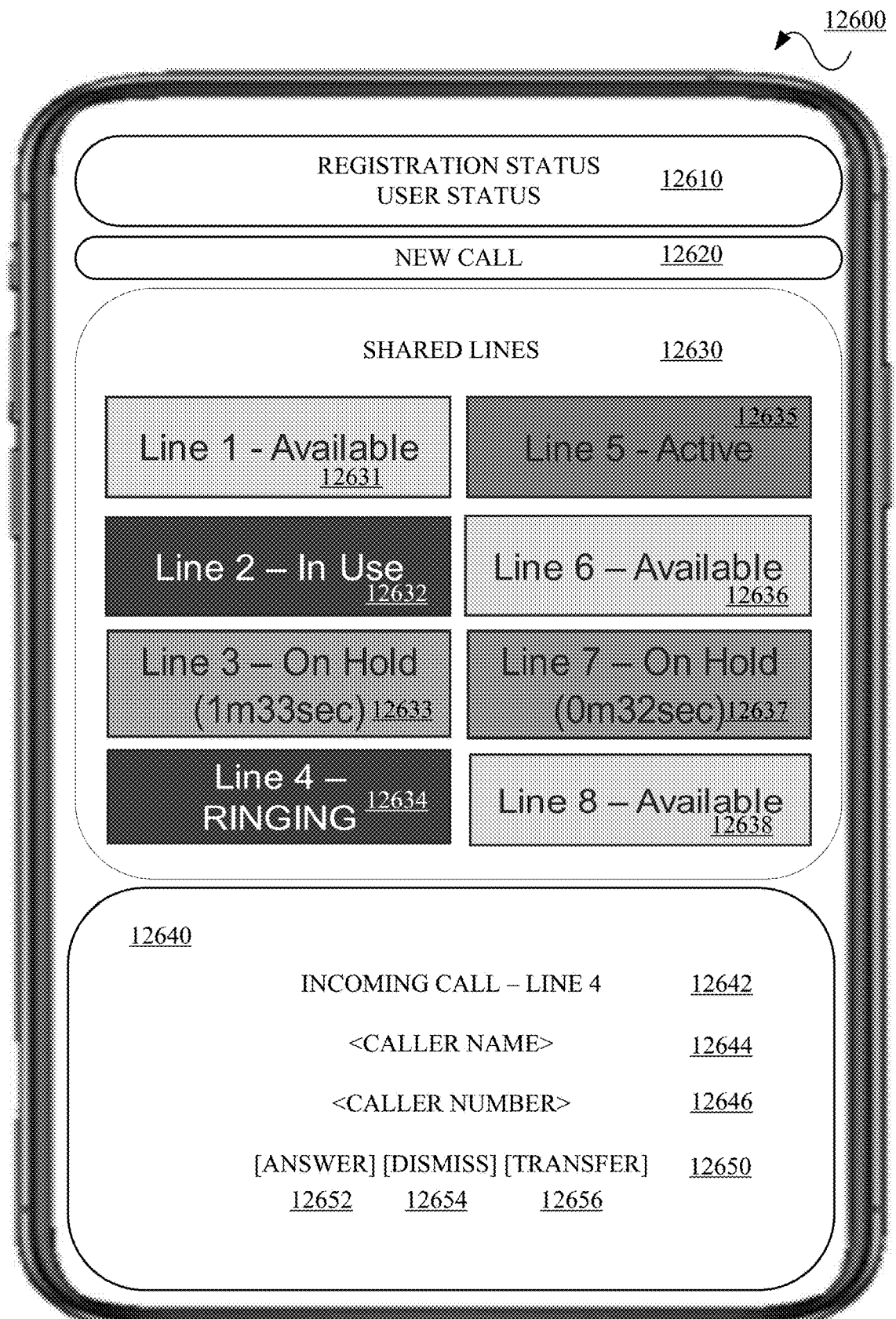
FIG. 12C is a diagram of an example shared line appearance—key system user interface in accordance with embodiments of this disclosure.

FIG. 12C is a diagram of an example shared line appearance—key system user interface 12600 with an incoming call in accordance with embodiments of this disclosure. The shared line appearance—key system user interface 12600 can include a registration status/user status section 12610, where a section can be a soft key, button, indicator area, and the like, a new call section 12620, a shared lines section 12630 and an incoming call section 12640. In implementations, the registration status/user status section 12610 can indicate the status of the personal line. The shared lines section 12630 can include multiple shared lines including shared line 1 12631, shared line 2 12632, shared line 3 12633, shared line 4 12634, shared line 5 12635, shared line 6 12636, shared line 7 12637, and shared line 8 12638. The status of the shared lines can include Available, Active, In Use, On Hold, Ringing, and the like. For example, the shared line 1 12631 has a status of Available, the shared line 2 12632 has a status of In Use, the shared line 3 12633 has a status of On Hold with a time, the shared line 4 12634 has a status of Ringing, the shared line 5 12635 has a status of Active, the shared line 6 12636 has a status of Available, the shared line 7 12637 has a status of On Hold with a time, and the shared line 8 12638 has a status of Available. The incoming call section 12640 can include an indication of which line has an incoming call 12642, a caller name 12644, a caller number 12646, and an action section 12650. The action section 12650 can include an answer section 12652, a dismiss section 12654, and a transfer section 12656.

Operationally and functionally with respect to a shared call or line appearance and FIGS. 12A, 12B, and 12C, each softphone client on an IP telephony device of key line system registers and subscribes to a personal line with designated features and also registers and subscribes to each of the shared lines with designated features or events in the key line system. In implementations, the designated features include call events, line seize events, and other like events. As shown, this can be done with the SIP server on the service provider system. This message information is captured by the key system module and used to generate a key line user interface which enables a user to see the status of the personal line and the shared lines and take actions as needed and as described herein.

In an illustrative example, a communication interaction is described with respect to three IP telephony devices with three softphone clients A, B, and C, respectively. Initially, softphone client A selects a Shared Line 1. Softphone client A sends a line-seize Subscribe message to the SIP server. In response to the line-seize event, the SIP server sends Notify messages to the softphone clients A, B and C. Softphone client A sends an Invite to a remote destination. The SIP server sends a line-seize terminated Notify message to softphone client A. The remote destination is in a ringing state. The SIP server sends a call-info progressing Notify message to softphone client A. The SIP server sends a call-info progressing Notify messages to softphone clients B and C. Remote destination answers call from softphone client A. The SIP server sends call-info active Notify message to softphone client A. The SIP server sends call-info active Notify messages to softphone clients B and C. In this scenario, the softphone client A will treat the Shared Line 1 as "Active" through all of the above states while softphone clients B and C will indicate Shared Line 1 is "In Use". If softphone client A later places the call on Hold, the Shared Line 1 will appear as "On Hold" for softphone clients A, B, and C. By using the key system module, the messages will be captured and each state as determined by the messages will be updated on each key line user interface on each IP telephony device as appropriate and applicable.

In an illustrative example, a communication interaction is described with respect to three IP telephony devices with three softphone clients A, B, and C, respectively. Initially, there is an incoming call into the key line system. The SIP server sends an Invite to each SIP identity associated with the softphone clients A, B, and C, respectively. The key line user interface will generate an incoming call user interface which will show caller identity, caller number, and the like. Softphone client A answers the incoming call on Shared Line 1 and sends a 200 OK message to the SIP server. The SIP server sends call info Notify messages to softphone clients A, B, and C indicating that Shared Line 1 is "Active". In this scenario, a "Ringing" status is the same for all softphone clients A, B, and C for the incoming call. Once softphone client A answers the incoming call on Shared Line 1, the status changes to "Active" for softphone client A. For softphone clients B and C, the status of Shared Line 1 will appear as "In Use" since the active call is not associated with the "Shared Line 1" identities associated with softphone clients B and C.

Figure 13A:
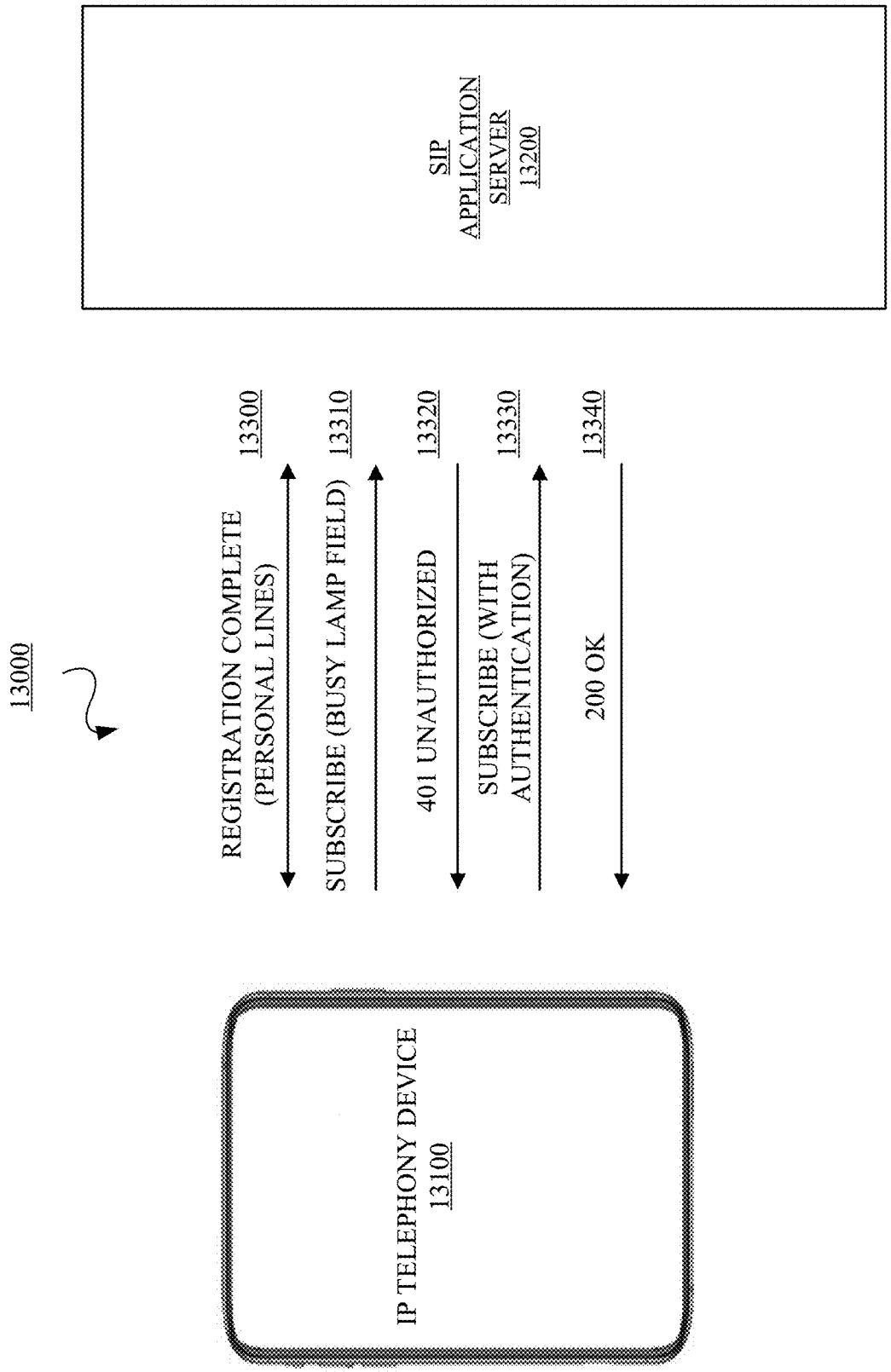
FIG. 13A is a diagram of an example group monitor appearance registration and subscription flow in accordance with embodiments of this disclosure.

FIG. 13A is a diagram of an example group monitor appearance registration and subscription flow 13000 in accordance with embodiments of this disclosure. The flow 13000 is described with respect to a provisioned IP telephony device 13100 and a SIP application server 13200 (which can be in the service provider managed cloud PBX 2100 of FIG. 2, for example) and is not inclusive of all messages and highlights key messages without departing from the scope of the specification or the claims. The key module system captures the messages in the flows described herein (including those not shown for purposes of illustration but are understood to one of skill in the technology) and generates the key line accessible, presentable, and/or actionable user interfaces described herein.

The provisioned IP telephony device 13100 registers and subscribes per the flow 11000 of FIG. 11 (13300). The IP telephony device 13100 or softphone application sends a Subscribe message for busy lamp field to the SIP application server 13200 (13310). The SIP application server 13200 sends a 401 Unauthorized message in response to the Subscribe message (13320). The IP telephony device 13100 or softphone application sends a Subscribe with Authentication message for the busy lamp field to the SIP application server 13200 (13330). The SIP application server 13200 sends a 200 OK message in response to the Subscribe with Authentication message (13340). In implementations, each user of the group lines registers and subscribes a personal line. In implementations, each user registers and subscribes for each group line in the group. In implementations, a call can be parked on one of the group lines by selecting a park line. In implementations, a park call soft key can be pressed, which would automatically select an available park extension. The status of the automatically selected park extension would be updated accordingly.

Figure 13B:
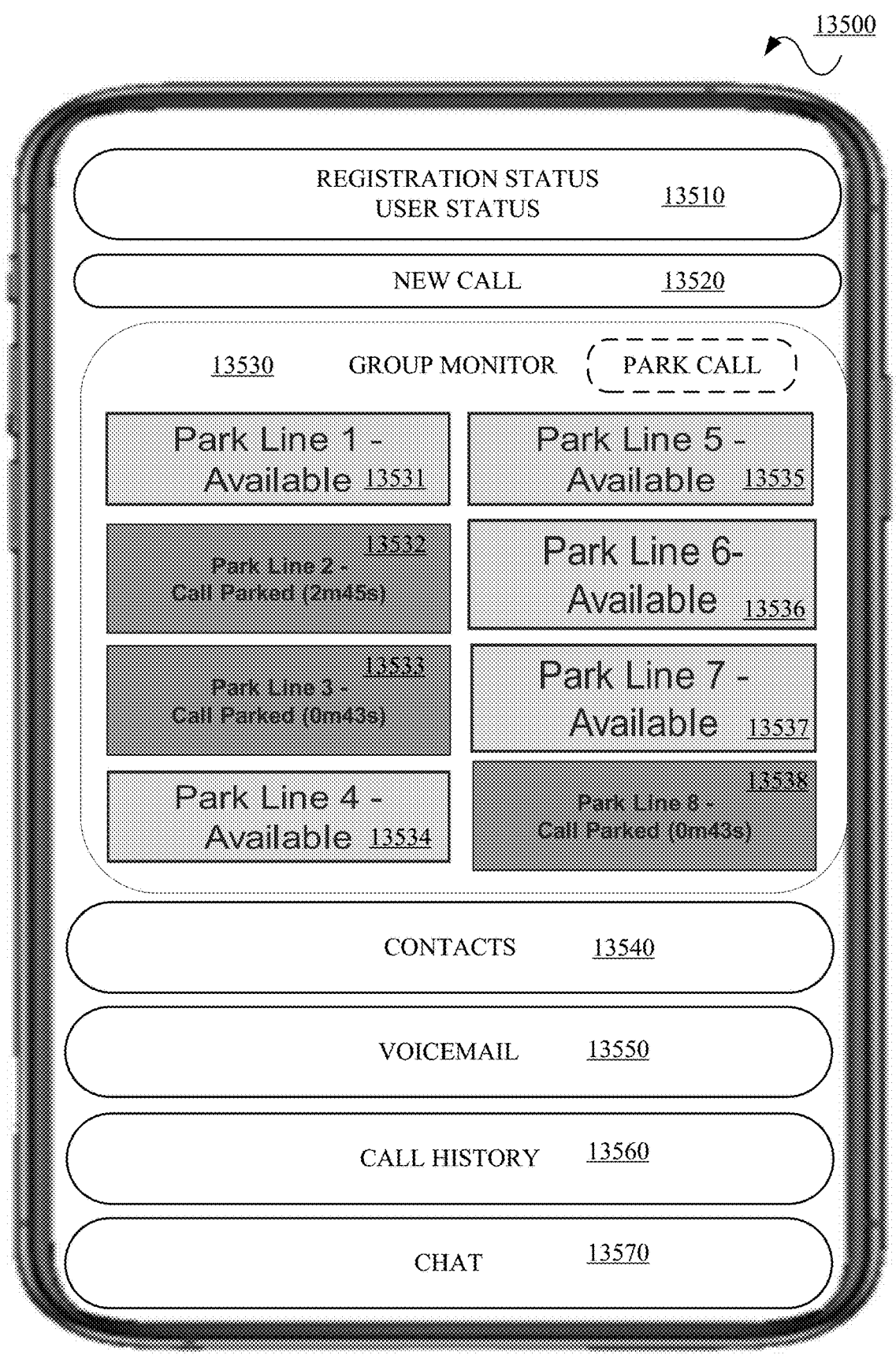
FIG. 13B is a diagram of an example group monitor appearance—key system user interface in accordance with embodiments of this disclosure.

FIG. 13B is a diagram of an example group monitor appearance—key system user interface 13500 in accordance with embodiments of this disclosure. The group monitor appearance—key system user interface 13500 can include a registration status/user status section 13510, where a section can be a soft key, button, indicator area, and the like, a new call section 13520, a group monitor section 13530, a contacts section 13540, a voicemail section 13550, a call history section 13560, a chat section 13570, and other sections or features as described herein. In implementations, the registration status/user status section 13510 can indicate the status of the personal line. The group section 13530 can include multiple park lines including park line 1 13531, park line 2 13532, park line 3 13533, park line 4 13534, park line 5 13535, park line 6 13536, park line 7 13537, and park line 8 13538. The status of the park lines can include Available, Call Parked, and the like. For example, the park line 1 13531 has a status of Available, the park line 2 13532 has a status of Call Parked for a defined time, the park line 3 13533 has a status of Call Parked for a defined time, the park line 4 13534 has a status of Available, the park line 5 13535 has a status of Available, the park line 6 13536 has a status of Available, the park line 7 13537 has a status of Available, and the park line 8 12538 has a status of Call Parked for a defined time.

Figure 14A:
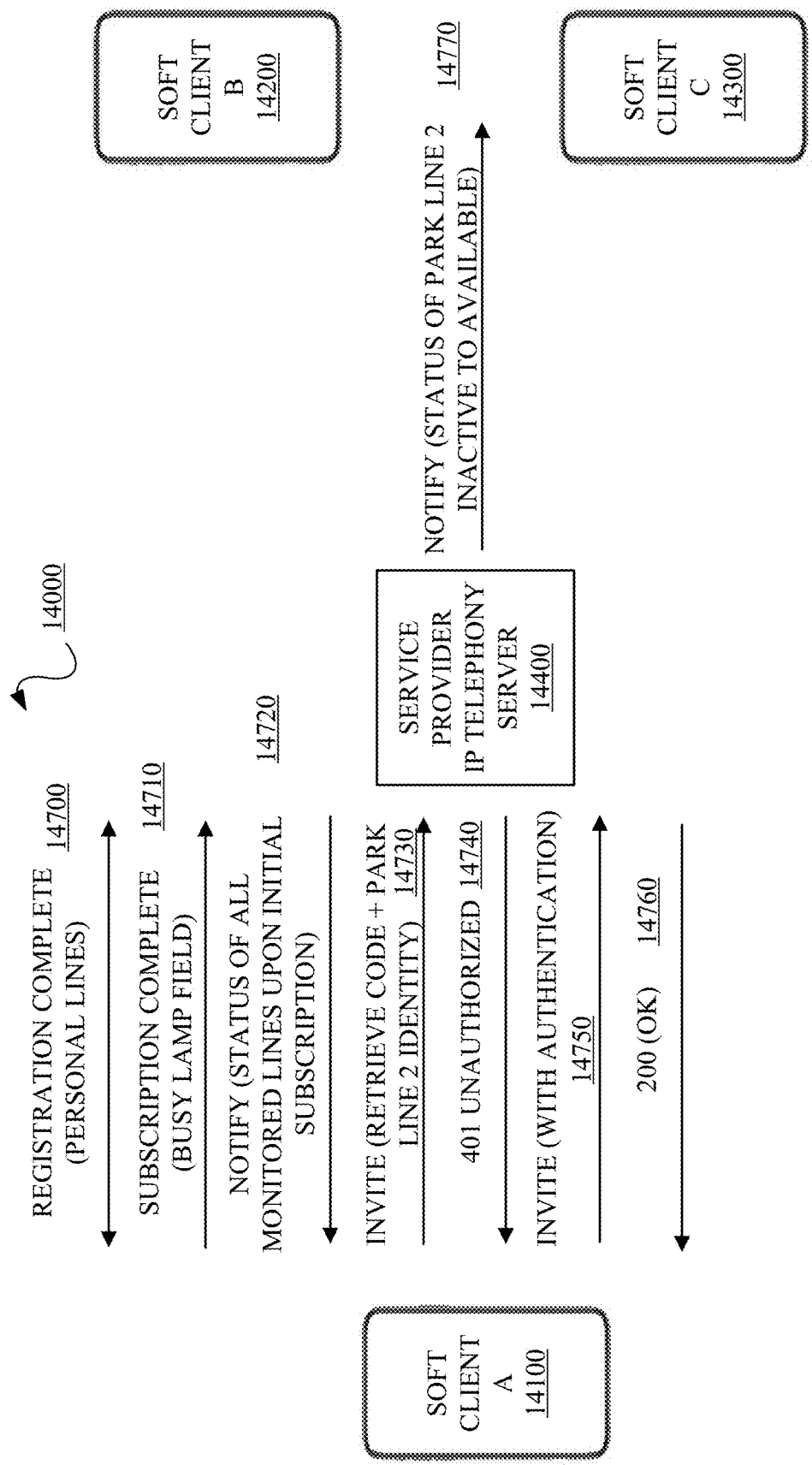
FIG. 14A is a diagram of an example group monitor line selection flow in accordance with embodiments of this disclosure.
Figure 14B:
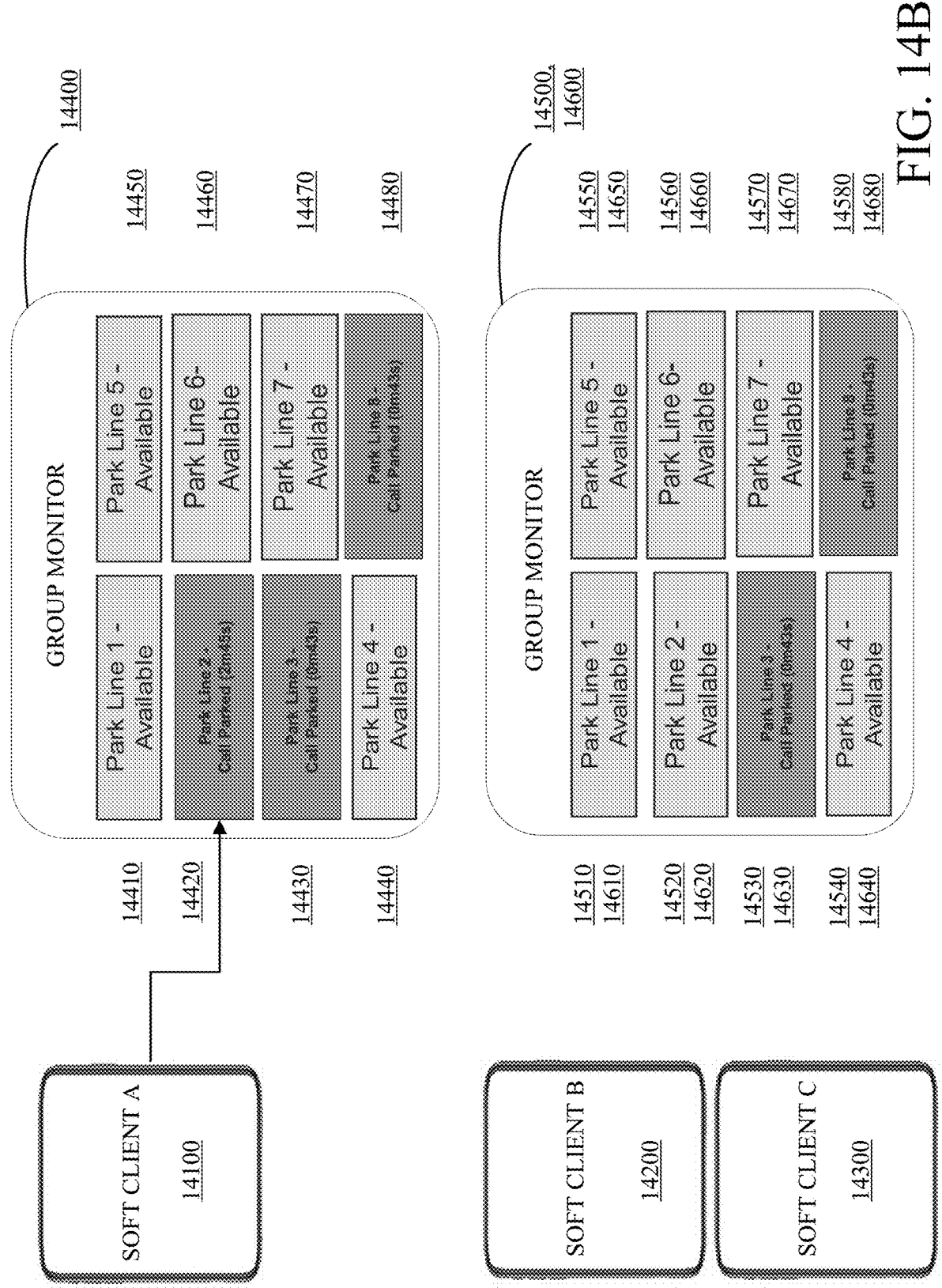
FIG. 14B is a diagram of an example group monitor appearance—key system user interfaces in accordance with the line selection flow of FIG. 14B.

FIG. 14A is a diagram of an example group monitor line selection flow in accordance with embodiments of this disclosure. FIG. 14B is a diagram of an example group monitor appearance—key system user interfaces in accordance with the line selection flow of FIG. 14A. The flow 14000 is described with respect to a provisioned IP telephony device A or soft client A 14100, a provisioned IP telephony device B or soft client B 14200, a provisioned IP telephony device C or soft client C 14300, and service provider IP telephony server 14400. Each of the soft client A 14100, the soft client B 14200, and the soft client C 14300 includes a group monitor user interface 14400, 14500, and 14600, respectively. Each of the group monitor user interfaces 14400, 14500, and 14600 displays soft keys for multiple park lines. In this instance, each of the group monitor user interfaces 14400, 14500, and 14600 includes a park line 1 14410, 14510, and 14610, a park line 2 14420, 14520, and 14620, a park line 3 14430, 14530, and 14630, a park line 4 14440, 14540, and 14640, a park line 5 14450, 14550, and 14650, a park line 6 14460, 14560, and 14660, a park line 7 14470, 14570, and 14670, and a park line 8 14480, 14580, and 14680. The flow 14000 is not inclusive of all messages and highlights key messages without departing from the scope of the specification or the claims. The key module system captures the messages in the flows described herein (including those not shown for purposes of illustration but are understood to one of skill in the technology) and generates the group monitor or park line accessible, presentable, and/or actionable user interfaces described herein.

In this scenario, a softphone client A 14100 completes registration and subscription of a personal line (14700). The softphone client A 14100 completes subscription for busy lamp field for all group monitor lines (14710). The softphone client A 14100 receives a Notify message for status of all monitored lines after registration and subscription is complete (14720). The key module system in the softphone client A 14100 generates the group monitor user interface 14400 as shown in FIG. 14B from the Notify message that includes the busy lamp field for all group monitor lines. In this instance, the Notify message indicates that park lines 14410, 14440, 14450, 14460, and 14470 are available and park lines 14420, 14430, and 14480 have calls parked against identities associated with those lines.

A user of the softphone client A 14100 selects or presses park line 2 to receive a parked call. This initiates a new call leg (sending of an Invite in SIP) to the service provider IP telephony server 14400 using a feature code (a retrieve code in SIP) including the destination identity of the park line 2 (14730). The service provider IP telephony server 14400 sends a 410 Unauthorized in response to the Invite (14740). The softphone client A 14100 responds with an Invite with authentication (14750). The service provider IP telephony server 14400 response with a 200 (OK) and connects the call parked on park line 2 14420 with the softphone client A 14100 (14760). The softphone client A 14100 is now in an Active call with the caller that was previously parked on park line 2 14420. The status of park line 2 is changed from Parked Call to Active. The service provider IP telephony server 14400 sends a Notify message to all subscribed softphone clients indicated the change to park line 2 from Parked Call to Available (14770). The key module systems in the softphone client B 14200 and the softphone client C 14300 generate the group monitor user interface 14500 and 14600, respectively, as shown in FIG. 14B from the Notify message that includes the updated status of park line 2 14520 and 14620, respectively.

Figure 15:
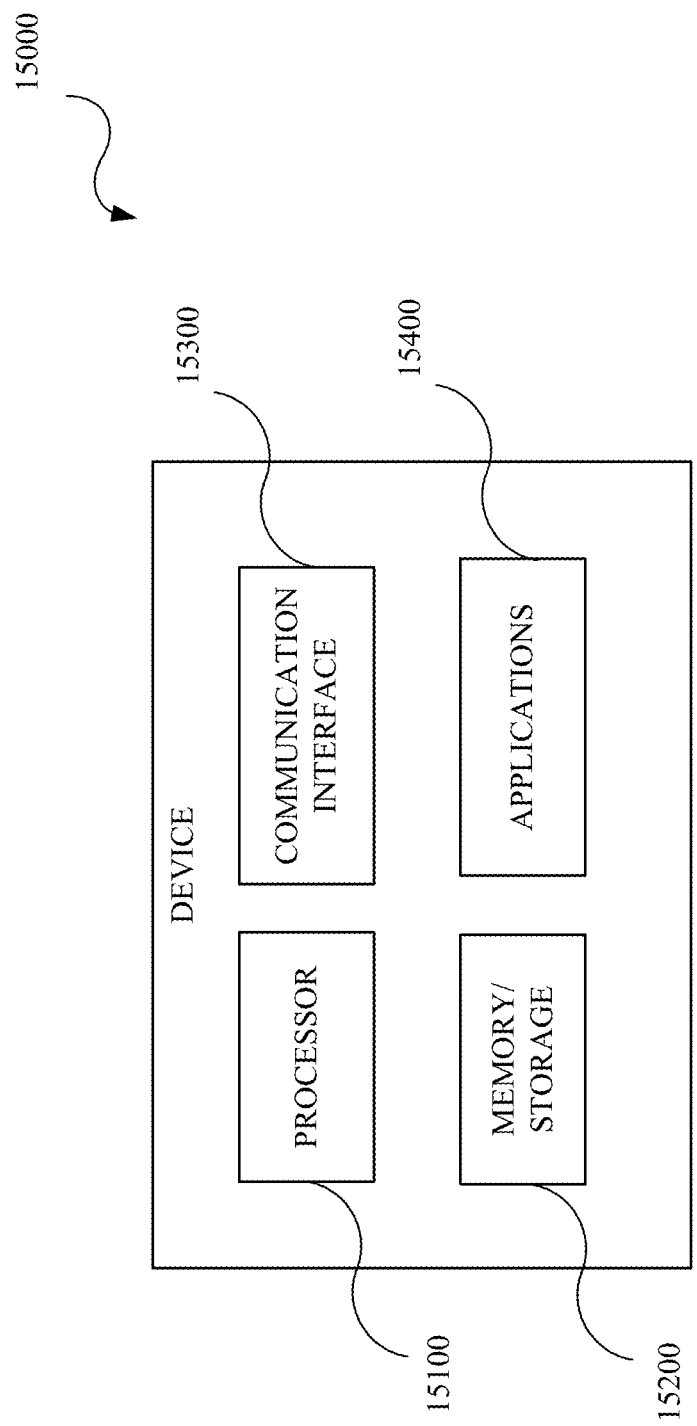
FIG. 15 is a diagram of an example device in accordance with embodiments of this disclosure.

FIG. 15 is a block diagram of an example of a device 15000 in accordance with embodiments of this disclosure. The device 15000 may include, but is not limited to, a processor 15100, a memory/storage 15200, a communication interface 15300, and applications 15400. The device 15000 may include or implement, for example, the communication devices 2200, the wired devices 2400, the wireless devices 2500, the provisioned IP telephony device 4100, the provisioned IP telephony device 4200, the provisioned IP telephony device 11100, the SIP application server 11200, the provisioned IP telephony device 12100, the SIP application server 12200, the provisioned IP telephony device 13100, the SIP application server 13200, the provisioned IP telephony device A or soft client A 14100, the provisioned IP telephony device B or soft client B 14200, the provisioned IP telephony device C or soft client C 14300, and the like. In an implementation, the memory/storage 15200 may store the IP telephone status, registration information, subscription information, status, user interface information, and the like. The applications 15400 can include the softphone application, the key system module, and the like. The input, selection, and update techniques or methods described herein may be stored in the memory/storage 15200 and executed by the processor 15100 in cooperation with the memory/storage 15200, the communications interface 15300, and applications 15400, as appropriate. The device 15000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 16:
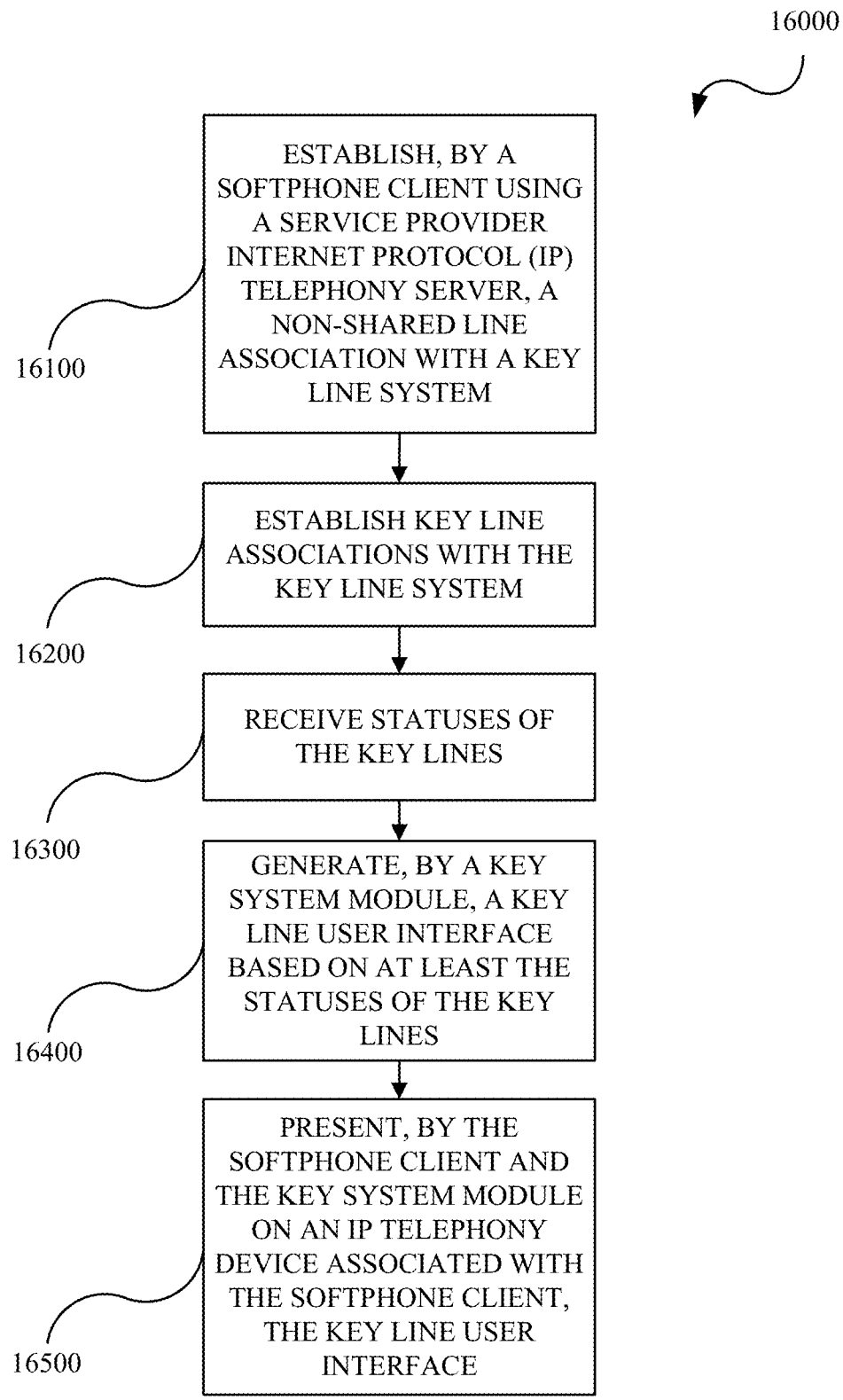
FIG. 16 is a flowchart of an example method for implementing key system module in accordance with embodiments of this disclosure.

FIG. 16 is a flowchart of an example method 16000 in accordance with embodiments of this disclosure. The method 16000 includes: establishing 16100, by a softphone client using a service provider Internet Protocol (IP) telephony server, a non-shared line association with a key line system; establishing 16200 key line associations with the key line system; receiving 16300 statuses of the key lines; generating 16400, by a key system module, a key line user interface based on at least the statuses of the key lines; and presenting 16500, by the softphone client and the key system module on a provisioned IP telephony device associated with the softphone client, the key line user interface. For example, the technique 16000 may be implemented, as applicable and appropriate, by the communication devices 2200, the wired devices 2400, the wireless devices 2500, the provisioned IP telephony device 4100, the provisioned IP telephony device 4200, the provisioned IP telephony device 11100, the SIP application server 11200, the provisioned IP telephony device 12100, the SIP application server 12200, the provisioned IP telephony device 13100, the SIP application server 13200, the provisioned IP telephony device A or soft client A 14100, the provisioned IP telephony device B or soft client B 14200, the provisioned IP telephony device C or soft client C 14300, the processor 15100, the memory/storage 15200, the communication interface 15300, and the applications 15400.

The method 16000 includes establishing 16100, by a softphone client using a service provider Internet Protocol (IP) telephony server, a non-shared line association with a key system. Each softphone client registers and subscribes a private or personal line with the key system. The subscription can include features associated with the key system such as voicemail, chat, and others as described herein.

The method 16000 includes establishing 16200 key line associations with the key system. The softphone client then registers and subscribes for each of the key lines in the key system. The subscription can include voicemail, call information, line seize, busy lamp signal, and the like to use the key system and receive status notifications for the key lines.

In implementations, the key lines can be shared lines where each line each shared line can be used for in-bound and out-bound calls. In implementations, the key lines can park lines where each line each park line can be used for in-bound calls.

The method 16000 includes receiving 16300 statuses of the key lines. Upon completion of the registration process, the service provider IP telephony server provides a current status of all key lines. Status updates can be received by each soft client in the key system when a key line status changes.

The method 16000 includes generating 16400, by a key system module, a key line user interface based on at least the statuses of the key lines. The key system module can capture the statuses of the key lines and generate the key line user interface based on the statuses. The key line user interface is updated each time a key line status changes.

The method 16000 includes presenting 16500, by the softphone client and the key system module on an IP telephony device associated with the softphone client, the key line user interface. Each key line is associated with a soft key for visualizing the status and for selecting the key line. Each updated key line user interface is refreshed as appropriate.

In general, a method for implementing a key system for devices provisioned with a softphone application includes provisioning a key system module for operation with the softphone to enable the key system, establishing, by the softphone application using a service provider Internet Protocol (IP) telephony server, a non-shared line association with the key system, establishing, by the softphone application using the service provider IP telephony server, associations with key lines in the key system, receiving, from the service provider IP telephony server, statuses of the key lines, generating, by the key system module, a key line user interface based on at least the statuses of the key lines, and presenting, by the softphone application and the key system module on a device associated with the softphone client, the key line user interface with each of the key lines in the key system. In implementations, the method further comprising independently establishing, by the softphone application using the service provider IP telephony server, an association with each key line in the key system. In implementations, each key line services one or more telephone numbers or identities. In implementations, the key lines service one or more telephone numbers or identities. In implementations, the method further comprising receiving, from the service provider IP telephony server, updates when the status of a key line changes, generating, by the key system module, an updated key line user interface based on at least the updates, and presenting, by the softphone application and the key system module on the device associated with the softphone application, an updated key line user interface. In implementations, each key line is associated with a soft key in the key line user interface, the method further comprising selecting, by a user on the device, a key line to perform an action. In implementations, the action includes at least making a call, retrieving a call, placing a call on hold, parking a call, answering a call, placing a call in to voicemail, and transferring a call. In implementations, the key line user interface includes at least one of a voicemail soft key, a chat soft key, a contacts soft key, a call history soft key, and an instant messaging soft key. In implementations, the establishing, by a softphone client using a service provider IP telephony server, a non-shared line association with a key line system further comprising subscribing to a common voicemail for the key lines in the key system. In implementations, the establishing, by a softphone application using a service provider IP telephony server, a non-shared line association with a key line system further comprising subscribing to a voicemail for each key line in the key system.

In general, a device including an embedded voice application configured to enable IP based communications with similarly provisioned devices, the embedded voice application is a member of a key system including key lines and a key system module. The key system module configured to capture status information for each key line in the key system, and generate a key line user interface based on at least the statuses of the key lines. The embedded voice application and the key system module collectively configured to present the key line user interface for access by a user to visualize and act upon presented key lines. In implementations, the embedded voice application and the key system module are integrated. In implementations, the device further comprising a device user interface module, wherein the key system module is integrated with the device user interface module. In implementations, the key system module is configured to capture updates to the status information when appropriate for each key line and generate updated key line interfaces. In implementations, the key line interface includes a soft key for each key line and the user can at least make a call, retrieve a call, place a call on hold, park a call, answer a call, place a call in to voicemail, and transfer a call by selecting a key line with an associated soft key. In implementations, the key line interface includes at least one of a voicemail soft key, a chat soft key, a contacts soft key, a call history soft key, and an instant messaging soft key.

In general, a key system for Internet Protocol (IP) telephony provisioned devices, the system including a service provider IP telephony server configured to provide a key system including multiple key lines, a plurality of IP telephony provisioned devices connected to the key system, each IP telephony provisioned device having a softphone client configured to enable IP based communications with at least other IP telephony provisioned devices in the key system, and a key system module. The key system module configured to capture call information related to each key line in the key system and generate a key line user interface based on at least the call information of the key lines. The softphone client and the key system module collectively configured to display the key line user interface with all the key lines for use by the user. In implementations, the softphone client and the key system module are integrated. In implementations, the system further including an IP telephony provisioned device user interface module, where the key system module is integrated with the IP telephony device user interface module. In implementations, the key line user interface includes a soft key for each key line and the user can at least make a call, retrieve a call, place a call on hold, park a call, answer a call, place a call in to voicemail, barge into a call, and transfer a call by selecting a key line with an associated soft key.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for implementing a key system for devices provisioned with a softphone application, the method comprising:

provisioning, for each device of the devices in the key system, a key system module for operation with an associated softphone application to enable the key system;

establishing, by each associated softphone application using a service provider Internet Protocol (IP) telephony server, a non-shared line association with the key system, each non-shared line association configured for use with an associated device from the devices in the key system;

establishing, by each associated softphone application using the service provider IP telephony server, associations with key lines in the key system, the key lines configured for use by each device of the devices in the key system;

receiving, from the service provider IP telephony server, statuses of the key lines based on use by the devices in the key system;

generating, by each key system module, a key line user interface based on at least the statuses of the key lines; and presenting, by each associated softphone application and each associated key system module on an associated device, an associated key line user interface with each of the key lines in the key system.

2. The method of claim 1, further comprising:
independently establishing, by each associated softphone application using the service provider IP telephony server, an association with each key line in the key system.

3. The method of claim 2, wherein each key line services one or more telephone numbers or identities.

4. The method of claim 2, wherein the key lines service one or more telephone numbers or identities.

5. The method of claim 1, further comprising:
receiving, from the service provider IP telephony server, updates when the status of a key line changes;
generating, by each key system module, an updated key line user interface based on at least the updates; and
presenting, by each associated softphone application and each associated key system module on an associated device, an updated key line user interface.

6. The method of claim 5, wherein each key line is associated with a soft key in the key line user interface, the method further comprising:
selecting, by a user on the device, a key line to perform an action.

7. The method of claim 6, wherein the action includes at least making a call, retrieving a call, placing a call on hold, parking a call, answering a call, placing a call in to voicemail, and transferring a call.

8. The method of claim 7, wherein the key line user interface includes a voicemail soft key, a chat soft key, a contacts soft key, a call history soft key, and an instant messaging soft key.

9. The method of claim 1, wherein the establishing, by each associated softphone application using a service provider Internet Protocol (IP) telephony server, a non-shared line association with the key system, each non-shared line association configured for use with an associated device from the devices in the key system further comprises:
subscribing to a common voicemail for the key lines in the key system.

10. The method of claim 1, wherein the establishing, by each associated softphone application using a service provider Internet Protocol (IP) telephony server, a non-shared line association with the key system, each non-shared line association configured for use with an associated device from the devices in the key system further comprises:
subscribing to a voicemail for each key line in the key system.

11. A key system comprising:
multiple devices communicating within the key system;
key lines; and
a non-shared line for each device,
wherein each device includes:
an embedded voice application configured to enable IP based communications with other devices in the key system; and
a key system module configured to:
capture status information for each key line in the key system, the status reflecting usage of each key line by the similarly provisioned devices; and
generate a key line user interface based on at least the statuses of the key lines; and
the embedded voice application and the key system module collectively configured to present the key line user interface for access by a user to visualize and act upon the presented key lines and non-shared line.

12. The key system of claim 11, wherein the embedded voice application and the key system module are integrated.

13. The key system of claim 11, further comprising:
a device user interface module, wherein the key system module is integrated with the device user interface module.

14. The key system of claim 11, wherein the key system module is configured to capture updates to the status information when appropriate for each key line and generate updated key line interfaces.

15. The key system of claim 11, wherein the key line interface includes a soft key for each key line and the user can at least make a call, retrieve a call, place a call on hold, park a call, answer a call, place a call in to voicemail, and transfer a call by selecting a key line with an associated soft key.

16. The key system of claim 11, wherein the key line interface includes a voicemail soft key, a chat soft key, a contacts soft key, a call history soft key, and an instant messaging soft key.

17. A key system for Internet Protocol (IP) telephony provisioned devices, the system comprising:
a service provider IP telephony server configured to provide a key system including multiple key lines and a non-shared line; and
a plurality of IP telephony provisioned devices connected to the key system, each IP telephony provisioned device having a softphone client configured to enable IP based communications with at least other IP telephony provisioned devices in the key system, and a key system module, the key system module configured to:
capture call information related to each key line in the key system, the call information reflecting usage of each key line by the at least other IP telephony provisioned devices; and
generate a key line user interface based on at least the call information of the key lines; and
the softphone client and the key system module collectively configured to display the key line user interface with all the key lines for use by the user.

18. The system of claim 17, wherein the softphone client and the key system module are integrated.

19. The system of claim 17, further comprising:
an IP telephony provisioned device user interface module, wherein the key system module is integrated with the IP telephony device user interface module.

20. The system of claim 17, wherein the key line user interface includes a soft key for each key line and the user can at least make a call, retrieve a call, place a call on hold, park a call, answer a call, place a call in to voicemail, barge into a call, and transfer a call by selecting a key line with an associated soft key.

* * * * *